US012765439B2

(12) United States Patent
Maurus

(10) Patent No.: US 12,765,439 B2
(45) Date of Patent: Oct. 20, 2026

(54) AGRICULTURAL VEHICLE WITH A WORKING COMPONENT AND A METHOD FOR CONTROLLING THE WORKING COMPONENT

(71) Applicant: AGCO International GmbH, Neuhausen (CH)

(72) Inventor: Werner Maurus, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 157 days.

(21) Appl. No.: 18/766,836

(22) Filed: Jul. 9, 2024

(65) Prior Publication Data

US 2025/0024769 A1 Jan. 23, 2025

(30) Foreign Application Priority Data

Jul. 18, 2023 (GB) ...................................... 2311002

(51) Int. Cl.

| | |
|---|---|
| ***A01B 63/102*** | (2006.01) |
| ***B62D 49/06*** | (2006.01) |
| ***E02F 9/20*** | (2006.01) |
| ***E02F 9/22*** | (2006.01) |
| ***G05G 9/047*** | (2006.01) |

(Continued)

(52) U.S. Cl.

CPC ............ *A01B 63/102* (2013.01); *B62D 49/06* (2013.01); *E02F 9/2004* (2013.01); *E02F 9/2203* (2013.01); *G05G 9/047* (2013.01); *A01D 90/10* (2013.01); *E01H 5/061* (2013.01); *G05G 2009/04766* (2013.01)

(58) Field of Classification Search

CPC ......... E02F 9/20; E02F 9/2004; E02F 9/2203; A01B 63/102; B62D 49/06; G05G 9/047; G05G 2009/04766; G07C 5/0825; G07C 5/0833; A01D 90/10; E01H 5/061

USPC ............................................ 180/333; 701/50

See application file for complete search history.

(56) References Cited

U.S. PATENT DOCUMENTS

| | | | | |
|---|---|---|---|---|
| 8,746,395 | B2 * | 6/2014 | Frazier ............... | G05G 9/04788 180/335 |
| 10,377,458 | B1 | 8/2019 | McGinley | |
| 11,882,781 | B2 | 1/2024 | Albrecht et al. | |

(Continued)

FOREIGN PATENT DOCUMENTS

| | | | |
|---|---|---|---|
| JP | S5936843 | B2 | 9/1984 |
| WO | 2012010396 | A1 | 1/2012 |

(Continued)

OTHER PUBLICATIONS

UK Intellectual Property Office, Search Report for related UK Application No. GB2311002.6, dated Jan. 15, 2024, 4 pages.

*Primary Examiner* — Andrew Joseph Rudy

(57) ABSTRACT

A vehicle has a working component and a user-operable control device for controlling the working component. A method is used for controlling the working component by determining a first speed demand dependent on a first current operating range of the user-operable control device out of first and second operating ranges, and controlling a speed of a first motion drive connected with the working component according to the first speed demand. The first speed demand changes in a first discrete step in response to a movement of the user-operable control device from the first operating range to the second operating range.

15 Claims, 10 Drawing Sheets

(51) Int. Cl.
*A01D 90/10* (2006.01)
*E01H 5/06* (2006.01)

(56) References Cited

U.S. PATENT DOCUMENTS

| | | | | |
|---|---|---|---|---|
| 12,529,201 | B2 * | 1/2026 | Toyoda | E02F 3/431 |
| 2013/0306395 | A1 | 11/2013 | Frazier et al. | |
| 2022/0240428 | A1 | 8/2022 | Mengele et al. | |

FOREIGN PATENT DOCUMENTS

| | | | |
|---|---|---|---|
| WO | 2012022564 | A1 | 2/2012 |
| WO | 2013020856 | A2 | 2/2013 |
| WO | 2021121900 | A1 | 6/2021 |

* cited by examiner

AGRICULTURAL VEHICLE WITH A WORKING COMPONENT AND A METHOD FOR CONTROLLING THE WORKING COMPONENT

FIELD

The present disclosure relates generally to agricultural machines, such as farm tractors with implements attached thereto or self-propelled harvesters such as a forage harvester or combine and to systems for controlling drives on such agricultural machines.

BACKGROUND

An agricultural machine, such as a tractor or a forage harvester, is an arrangement used for transportation or agricultural operation. To perform such operations, motion drives are provided to move working components of the agricultural machine, e. g. tools or implements. These motion drives may be translational motion drives such as hydraulic cylinders or rotational motion drives such as hydraulic motors. In some implements, those motion drives may be energized by pneumatic or electric drives instead.

Some of these motion drives may be used to operate a three point linkage or hitch of a tractor; the three point linkage most frequently consist of two lower lifting arms to which an implement is attached. The lower lifting arms can be pivoted by one or more respective hydraulic actuating cylinders to adjust the height position of the implement relative to the tractor. An additional top link in the three point linkage connects the implement to the tractor above the lower lifting arms. This top link is used to pivot the implement about a horizontal transverse axis and is typically adjustable by means of a threaded connection or a hydraulic cylinder. Similar to the three point linkage, self-propelled harvesters are provided with header lift systems comprising lifting arms pivoted by hydraulic actuating cylinders to adjust the height position of the header relative to the self-propelled harvesters. Further motion drives may be provided on implements such as front loaders used with tractors, or headers used with self-propelled harvesters.

To control these motion drives, modern tractors or self-propelled forage harvesters are commonly equipped with electronic control systems. Such electronic control systems may improve work quality and operator comfort during an operation, for example to operate a tractor having a front end loader as an implement. Such control systems typically include a user-operable control device in the form of a multi-position switch, lever or joystick, having a first degree of freedom for moving the user-operable control device in a first control direction (e. g. away from the operator). The operation of the user-operable control device may effect a movement of a motion drive in a first control direction, e. g. to lower a tool holder or any other implement. Movement of the user-operable control device in a second control direction (e. g. towards the operator) may effect a movement of a motion drive in a second control direction, e. g. to raise the tool holder or any other implement. Suitably, a cessation of operator movement of the user-operable control device results in that the user-operable control device is biased back into neutral position, e. g. a central position, so that the motion drive is automatically held at its current position.

Furthermore, a user-operable control device may be provided to allow a movement in a first degree of freedom and a second degree of freedom wherein the first degree of freedom is approximately lateral (i. e. perpendicular) to the second degree of freedom. In other words, the user-operable control device can be moved in a direction away or towards from the operator, but also in a left or right direction from the operator. Such control devices may be cross-gate levers for example. In this case, the first degree of freedom may be used to control the movement of the motion drives raising and lowering the implement while the second degree of freedom may be used to control the movement of the motion drives to tilt the tool, e.g. a front end loader or pallet fork to dump the load therefrom.

Further examples of these types of control systems for hitches are described in patent publication WO 2021/001100 A1 and WO 2021/001101 A1, both published 7 Jan. 2021 and filed in the name of AGCO International GmbH.

In terms of hydraulic motion drives, these are most frequently controlled by hydraulic valves supplied with fluid by a pump. Dependent of the movement of the user-operable control device, the valve opens or blocks the flow of hydraulic fluid to the motion drive. Dependent on the degree the movement (e. g. the deviation angle) of the user-operable control device, the valve forwards a certain oil flow rate to the motion drive. The higher the oil flow rate is the faster the motion drive is moving (dependent on the load to be moved). A high flow rate may be suitable to quickly provide a movement of the motion drive, while a lower flow rate may be suitable to control an exact positioning of a motion drive, e. g. to adjust a height of an implement attached to a tractor.

BRIEF SUMMARY

Operation of an agricultural machine may be very difficult when a constant oil flow or a speed of a motion drive shall be kept especially when the control device is shaking due to the agricultural machine running on uneven ground or shocks which may occur when a front end loader is pushed into bulk material. Furthermore as the oil flow may be set very high to enable fast movement of a working component, e. g. to a move a front end loader to maximum height for dumping material of a front end loader, it may be difficult in other situations to precisely position a front end loader with the high oil flow rate. So, the operator may need to take an average oil flow to provide fast and precise control. This results in a compromise which does not enable optimal operation. The operator may change the oil flow via settings but this requires to take the hands from the user-operable control device and may interrupt the operation.

It is an objective to provide a control system for motion drives of a working component which enable fast movement and precise control by means of a control device in a simple and safe manner. In detail, the operator shall be enabled to change the oil flow without releasing the hand from the control device. Thereby comfort and safety is increased.

According to an aspect of the invention there is provided an agricultural machine comprising a working component, a first motion drive for adjusting a position of the working component, operator controls with a user-operable control device moveable in a first control direction from a first operating range to a second operating range and a control unit. The control unit is configured to determine a first speed demand dependent on a first current operating range of the user-operable control device out of the first and second operating ranges and to control the speed of the first motion drive according to the first speed demand. The first speed demand changes in a first discrete step in response to a movement of the user-operable control device from the first operating range to the second operating range.

The agricultural machine may be any vehicle or vehicle combination such as a tractor, a forage harvester, a combine, a sprayer, etc. The working component may be a front or rear hitch, or any implement connected to a hitch as for example a shovel or a plough. The working component may be a front end loader attached to the agricultural machine. The working component can also be a spout assembly attached to a harvester or a combine. The motion drive may be any adjustable drive such as an electric, hydraulic or pneumatic drive. For example, the motion drive may be a hydraulic cylinder or an electric motor. The motion drive may be attached to a corresponding working component and may be controlled by the control unit. The user-operable control device may be any movable input device rotatable about an axis such as a joystick or slidable along an axis such as a slider. When the user-operable control device is operated far enough in a control direction, for example if a joystick is rotated about a specific angle, the user-operable control device moves from the first operating range to the second operating range. The user-operable control device can be moved back to the first operating range if the user-operable control device is operated in the opposite direction.

The first speed demand corresponds to a speed value by which a motion drive shall be adjusted. For example, the speed demand may be defined by an oil flow in case of a hydraulic motion drive, a current or voltage level in case of an electric motion drive or any other control signal representing a speed value. The speed demand assigned to the first operating range may correspond to a speed value appropriate for a slower but precise control of the working component whereas the speed demand assigned to the second operating range may correspond to a speed value appropriate for a quicker control of the working component. Since the first speed demand changes in a discrete step in response to a movement of the user-operable control device from the first operating range to the second operating range, the speed of the motion drive will be adjusted accordingly. Due to the discrete step, the speed demand will be changed nonlinearly. Thus, a quicker adjustment of the speed of the motion drive can be achieved when the user-operable control device is moved to the other operating range in contrast to a linear change of the speed demand.

The user-operable control device may be moveable in a second control direction opposite to the first control direction from a third operating range to a fourth operating range. The control unit may be configured to determine a first speed demand dependent on a first current operating range of the user-operable control device out of the first to fourth operating ranges. The first speed demand may change in a second discrete step in response to a movement of the user-operable control device from the third operating range to the fourth operating range.

When the user-operable control device is moved in the first or second operating ranges, the motion drive may be driven in a first movement direction. The motion drive may be driven in a second movement direction contrary to the first movement direction when the user-operable control device is moved in the third or fourth operating range. Hence, a working component such as a front end loader may be raised up or lowered down. In case of a spout assembly, a spout bow of the spout assembly may be rotated in a left or right direction. Due to the first and second discrete steps, the speed demand is changeable nonlinearly for moving operations of the motion drive in the first and in the second movement direction. Thus, a quick adjustment of the speed of the motion drive for a precise or quick control of the working component is provided for both movement directions of the working component.

The user-operable control device may comprise a neutral position between the first operating range and the third operating range.

When the user-operable control device is moved in the neutral position, the movement of the motion drive may be stopped. The control unit may determine a corresponding speed demand and control the motion drive accordingly. When the user-operable control device is actuated in the first or in the third operating range, a releasing of the user-operable control device may result in a self-actuated recapture of the neutral position to avoid that the motion drive controlled by the user-operable control device is supplied when the operator (unintentionally) releases the user-operable control device.

The first discrete step may have a different value than the second discrete step.

The first discrete step may be higher or lower than the second discrete step to achieve a faster or slower adjustment of the speed of the motion drive when the user-operable control device is operated in the first control direction compared to an operation in the second control direction.

The agricultural machine may comprise a second motion drive for adjusting a position of the working component. The user-operable control device may be moveable in a third control direction lateral to the first control direction from a fifth operating range to a sixth operating range. The control unit may be configured to determine a second speed demand dependent on a second current operating range of the user-operable control device out of the fifth and sixth operating ranges and control the speed of the second motion drive according to the second speed demand. The second speed demand may change in a third discrete step in response to a movement of the user-operable control device from the fifth operating range to the sixth operating range.

The working component may comprise a tool holder and a tool relatively movable in respect of the tool holder. The tool holder may be driven by one the first and second motion drives and the tool may be driven by the other motion drive.

Analogously to the first motion drive, the second motion drive may be any adjustable drive such as an electric, hydraulic or pneumatic drive. The second motion drive may be attached to the same working component as the first motion drive or to a different working component. In case of a front end loader as working component for example, the first motion drive may adjust the height of a tool holder of the front end loader and the second working component may adjust an orientation of a tool (e. g. a shovel or fork) of the front end loader. Alternatively, the first motion drive may adjust the rear hitch and the second motion drive may adjust the front end loader. Based on the fifth and sixth operating ranges, a second speed demand may be determined for controlling the second motion drive with a different speed than the first motion drive. But both speed demands can be controlled by the same user-operable control device dependent on the control direction the user-operable control device is moved in. It is possible to move the user-operable control device in the first (or second) control direction and in the third control direction simultaneously to control the first and second motion drives simultaneously. Analogously to the first and second discrete steps of the first speed demand, the second speed demand can be adjusted by the third discrete step. The user-operable control device may be moveable in a fourth control direction opposite to the third control direction for moving the user-operable control device in a seventh and eight operating range. I. e., the first and second control directions are each provided by a first degree of freedom of the user-operable control device and the third and fourth control directions are each provided by a second degree of freedom of the user-operable control device. The transition of the user-operable control device from the seventh to the eight operating range (or vice versa) may change the speed demand by a fourth discrete step analogously to the other discrete steps.

One of the first and second motion drives may be a rotational motion drive providing a rotational movement. The other motion drive may be a translational motion drive providing a translational movement.

For example, the rotational motion drive may be a rotational motor and the translational motion drive may be a hydraulic cylinder. The rotational motion drive may rotate a spout assembly and the translational motion drive may adjust the height of a spout bow or the position of a spout flap of the spout assembly. Thus, depending on which control direction the user-operable control device is moved in, a rotational movement or a translational movement of the working component can be controlled. If the user-operable control device is moved in two control directions simultaneously (e. g. the first and third control direction) the working component may be moved rotationally and translationally simultaneously.

The user-operable control device may be configured to provide a haptic feedback due to a movement of the user-operable control device from the first operating range to the second operating range.

The haptic feedback may increase the operating force needed for a transition of the user-operable control device from the first operating range to the second operating range. So, the operator may feel a slight resistance when he moves the user-operable control device close to a transition point between the one operating range and the other operating range. This resistance must be overcome to move the user-operable control device from the first operating range to the second operating range. The mechanical resistance provides a haptic feedback to the operator to indicate that the transition point is reached. Thus, an unintentional movement of the user-operable control device from the one operating range to the other operating range can be avoided. The haptic feedback may be provided by a mechanical spring or any other actuator integrated in the user-operable control device. For example, resistance may be provided by a notch provided on a movable part of the user-operable control device which engages with a matching contour of the base part of user-operable control device, preferable biased by a spring. Alternatively, the haptic resistance position may be provided by a force-feedback system which uses electric energy to provide a resistance.

The first operating range and the second operating range may be each configured for demanding a constant speed value.

Thus, the motion drive controllable by the first and second operating range can move with a constant speed even when the user-operable control device is (unintentionally) moved within one of the first or second operating range because the same constant speed value is demanded within the one operating range. The user-operable control device may be manipulated unintentionally by the operator within an operating range due to vibrations of the operating agricultural machine or a tremor of the hand of the operator.

Alternatively, one of the first and second operating ranges may be configured for demanding a constant speed value and the other operating range may be configured for demanding an increasing or decreasing speed value.

Thus, the speed of the motion drive can be adjusted according to a movement of the user-operable control device within the operating range configured for demanding an increasing or decreasing speed value. This configuration may be used for lower speeds of the motion drive which may cause less vibrations than higher speeds of the motion drive. For operating the motion drive with high speed, the operating range configured for demanding a constant speed value may be used since this operating range is insensitive in respect of vibrations and unintentional manipulations of the user-operable control device due to such vibrations.

The first operating range may be configured for demanding a higher speed value than the second operating range.

Thus, the speed of the movement of the first motion drive will be reduced when the user-operable control device is moved from the first to the second operating range. In other words, the speed of the movement of the first motion drive will be reduced when the user-operable control device is moved away from the neutral position and will be increased when the user-operable control device is moved towards the neutral position.

The first operating range may be configured for demanding a higher speed value than the fifth operating range.

The first operating range is configured for demanding a speed value for the first motion drive. The fifth operating range may be configured for demanding a speed value for the second motion drive. Thus, the first motion drive can be controlled to move faster than the second motion drive. For example, the tool holder may be adjusted by the first motion drive for a rough but fast adjustment of the height of the tool whereas the tool may be adjusted by the second motion drive for a slower but more precise adjustment of the orientation of the tool.

The second operating range may be configured for demanding a floating mode for a self-adjustment of the position of the working component in dependence of a weight of the working component and/or forces applied vertically on said working component.

When the user-operable control device is moved in the first operating range, the speed of the motion drive is controlled according to the speed demand assigned to the first operating range. When the user-operable control device is moved in the second operating range, the floating mode (FLOAT mode) is demanded and the control unit controls the motion drive so that external forces acting on the working component can manipulate the position or orientation of the working component driven by the motion drive, for example moving the working component upwards or downwards. In case of a front end loader as working component for example, the floating mode may be advantageous when loading bulk material from the ground. The front end loader can rest on the ground to be pushed into the bulk material when the agricultural machine moves towards the bulk material. Even if the ground is undulated, the front end loader can follow the ground to scrap all material from ground into the shovel of the front end loader. If the operator returns the user-operable control device from the second operating range in the first operating range, the tool holder of the front end loader can be lifted with the speed demand assigned to the first operating range. Further examples such applications for operating a front end loader are described in patent publication WO 2013/020856 A1, published Feb. 14, 2013, and filed by AGCO International GmbH. The floating mode can also be advantageous for controlling implements or headers of a forage harvester which must be run smoothly over ground.

The operator controls may comprise a mode switch for activating the floating mode. The second operating range may be configured for demanding the floating mode when the floating mode is active and demanding a speed value when the floating mode is inactive.

When the mode switch for activating the floating mode is pressed by the operator, the working component may move into a floating position, in which external forces can manipulate the position or orientation of the working component as exemplarily described above. The mode switch may be designed as a toggle switch for switching between an active and an inactive state of the floating mode. The inactive floating mode may correspond to a selective mode. Depending on whether the floating mode is active or not, a different speed value may be assigned to the second operating range.

The first operating range may be configured for demanding a lower speed value when the floating mode is inactive and demanding a higher speed value when the floating mode is active.

Thus depending on whether the floating mode is active or not, a different speed value may be assigned to the first operating range analogously to the second operating range. Whereas the speed value assigned to the first operating range may be lower when the floating mode is inactive instead of active, the speed value assigned to the second operating range may be higher when the floating mode is inactive instead of active. Thus, the working component can be operated faster with an active floating mode when the user-operable control device is moved in the first operating range compared to an inactive floating mode.

The first operating range may be configured to move an element of the working component parallel to a driving direction of an agricultural machine. The fifth operating range may be configured to move the element of the working component lateral to the driving direction of the agricultural machine.

The operator controls may comprise a mode switch for activating a path mode. When the path mode is active, not only a speed value is demanded when the user-operable control device is moved in the first or fifth operating range but also a movement direction of the working component. The working component may be driven by two or more motion drives. Both motion drives may be actuated simultaneously when the user-operable control device is moved either in the first or the fifth operating range for moving the working component parallel or lateral to the driving direction. For example, the working component may be a spout assembly having a rotational motion drive for rotating a spout bow of the spout assembly and a translational motion drive such as a hydraulic cylinder for adjusting an axial position of the spout bow. The control unit may control the two motion drives so that the rotational movement and the translational movement of the spout bow result in the parallel or lateral movement direction as demanded by the user-operable control device. The speed of the two motion drives may be controlled by the control unit such that the speed of the spout bow in parallel direction corresponds to the speed value assigned to the first operating range and the speed of the spout bow in lateral direction corresponds to the speed value assigned to the fifth operating range.

Another aspect includes a method of controlling a working component. The method comprises steps for determining a first speed demand dependent on a first current operating range of a user-operable control device out of first and second operating ranges and controlling a speed of a first motion drive according to the first speed demand. The first speed demand changes in a first discrete step in response to a movement of the user-operable control device from the first operating range to the second operating range.

The control unit is configured to carry out the method steps for controlling the working component as described above. The method may comprise any actions for which the control unit is configured to execute. Thus, the method may additionally comprise at least one of the steps of determining a first speed demand dependent on a first current operating range of the user-operable control device out of the first to fourth operating ranges wherein the first speed demand may change in a second discrete step in response to a movement of the user-operable control device from a third operating range to a fourth operating range, determining a second speed demand dependent on a second current operating range of the user-operable control device out of a fifth and sixth operating ranges wherein the second speed demand may change in a third discrete step in response to a movement of the user-operable control device from the fifth operating range to the sixth operating range, controlling the speed of the second motion drive according to the second speed demand and providing a haptic feedback due to a movement of the user-operable control device from the first operating range to the second operating range.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
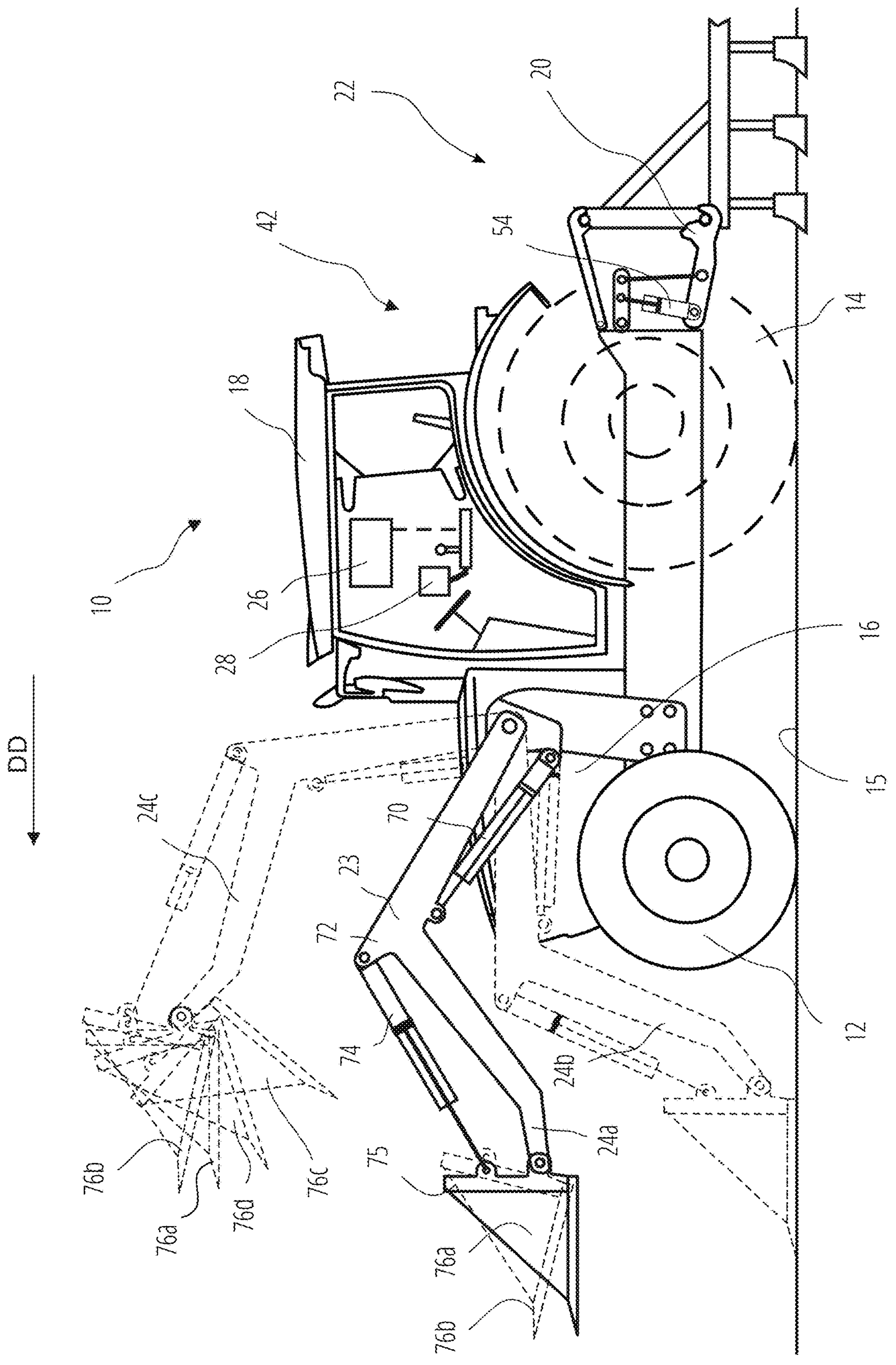
FIG. 1 schematically represents an agricultural machine in the form of a tractor having a rear implement hitch and a front end loader and operator controls for control of the same.
Figure 3:
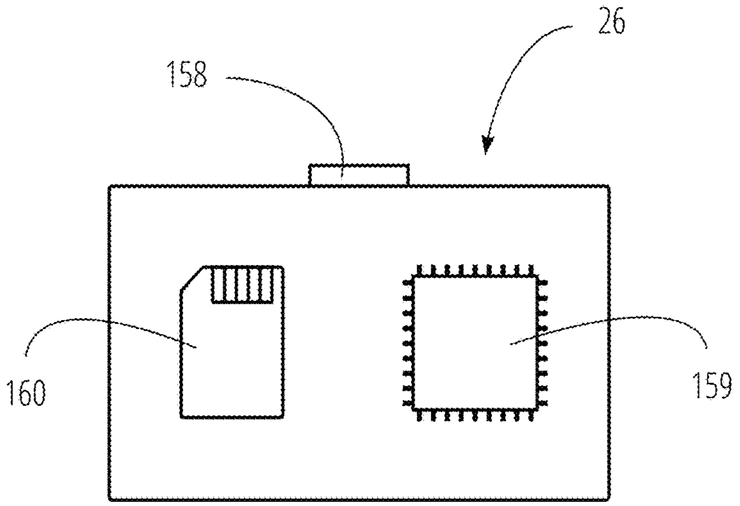
FIG. 3 illustrates a schematic representation of an electronic control unit (ECU)

FIG. 1 shows an agricultural machine. The agricultural machine may be any agricultural vehicle or vehicle combination comprising at least one working component. Here, the agricultural machine is exemplarily illustrated in the form of a tractor 10 with a first working component 22 and a second working component 23. The tractor 10 comprises front wheels 12, rear wheels 14, an engine section 16 and a cab section 18. In addition, the agricultural machine comprises motion drives for adjusting a position of the first and second working component 22 and 23. For example, a motion drive may be a hydraulic cylinder or motor connected with a corresponding working component. The first working component 22 may be designed as a rear hitch 20 or may be any implement connected to the rear hitch 20. The rear hitch 20 can be raised or lowered relative to the rest of the tractor 10 by a double-acting hydraulic cylinder 54 as motion drive. The implement, in this case a plough, is mounted to the rear hitch 20 such that lowering or raising of the hitch 20 via the double-acting hydraulic cylinder 54 brings the hitch-mounted implement into or out of engagement with the ground 15. The second working component 23 can be designed as a front hitch or may be any implement. Here, the second working component 23 is exemplarily depicted as an implement in terms of a front end loader comprising a tool holder 72 and a tool 75. The second working component 23 is mounted to the tractor 10. The tool holder 72 is designed as a front loader boom and is relatively moveable in respect of the tractor 10. The tool holder 72 is driven by a cylinder 70 as motion drive connected with the tractor 10. The tool 75 is relatively moveable in respect of the tool holder 72 by means of a cylinder 74 as motion drive arranged between the tool holder 72 and the tool 75. The operation of the second working component 23 is described later on. The tractor 10 further comprises at least one electronic control unit (ECU) 26 which is configured to control operation of various tractor systems. The cab section 18 is provided with operator controls 28 for control of the different components of the tractor 10, including the direct control of the height of the hitch 20. The operator controls 28 may comprise mechanical levers and/or electronic control devices incorporating configurable switches, touch-screen displays, etc. It will be understood that the ECU 26 is provided in communication with the operator controls 28. ECU 26 is shown in FIG. 3 in more detail and comprises a memory 160.

Figure 2:
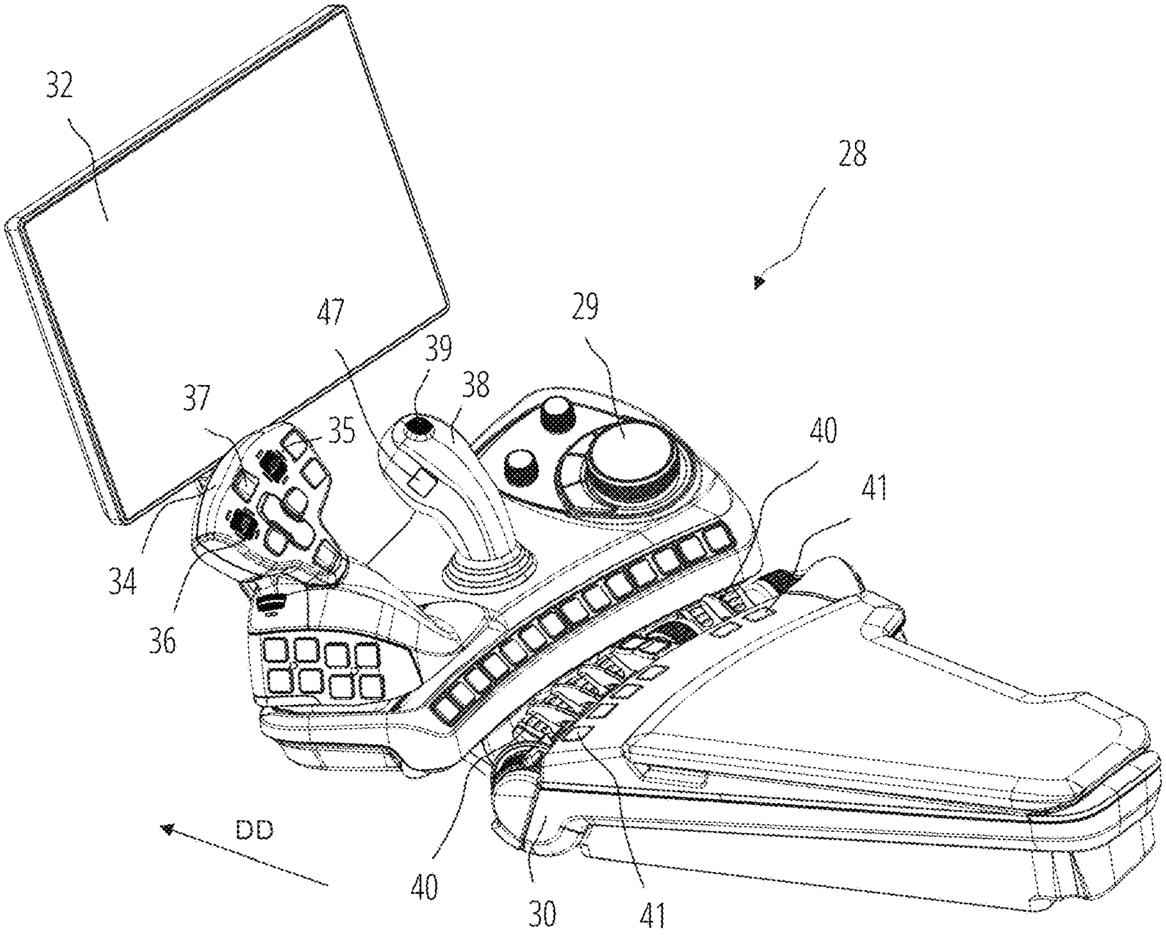
FIG. 2 shows the operator controls in the form of an armrest console for the vehicle of FIG. 1, including one or more user-operable control devices.

FIG. 2 shows the operator controls 28 in the form of an armrest 30 containing a display 32 for depicting information and input settings by means of a turn-and-press control device 29. The Display 32 is a touch sensitive display for controlling the agricultural machine or adjusting the settings of the agricultural machine. Furthermore, the operator controls 28 comprise different user-operable control devices such as a drive lever 34 comprising scroll wheel control devices 35, 36, a cross-gate control device 38 and several rocker control devices (control levers) 40. At least one of these user-operable control devices 35, 36, 38 and 40 is used as control element to control one or more motion drives of the agricultural machine such as of the tractor 10 itself or of the working components 22, 23 attached to the tractor 10. In the vicinity of said user-operable control devices 35, 36, 38 and 40, mode switches are additionally provided to select different modes for the respective user-operable control devices 35, 36, 38 or 40:

- A scroll wheel mode switch 37 is provided to switch the operation mode of scroll wheel control devices 35, 36;
- A cross-gate mode switch 39 is provided to switch the operation mode of cross-gate control device 38; and
- Rocker mode switches 41 are provided to switch the operation mode of each respective rocker control device 40.

The function of the user-operable control devices 35, 36, 38, 40 and mode switches 37, 39, 41 is explained later on.

FIG. 3 shows the electronic control unit (ECU) 26 comprising an interface 158, a controller 159 and a memory 160. The ECU 26 may receive and send signals or data via the interface 158. The interface 158 may be a wireless interface or a connector. The controller 159 may store the data or signals received by the ECU 26 in the memory 160. The memory 160 may contain additional data or executable computer program products, for example in terms of a computer-implemented method, that may be retrieved, processed or executed by the controller 159. The memory 160 can also store settings of one or more user-operable control devices. Data or signals resulting from the processing of data or signals or from the execution of a computer program product may be stored to the memory 160 or sent to the interface 158 by the controller 159.

Figure 4:
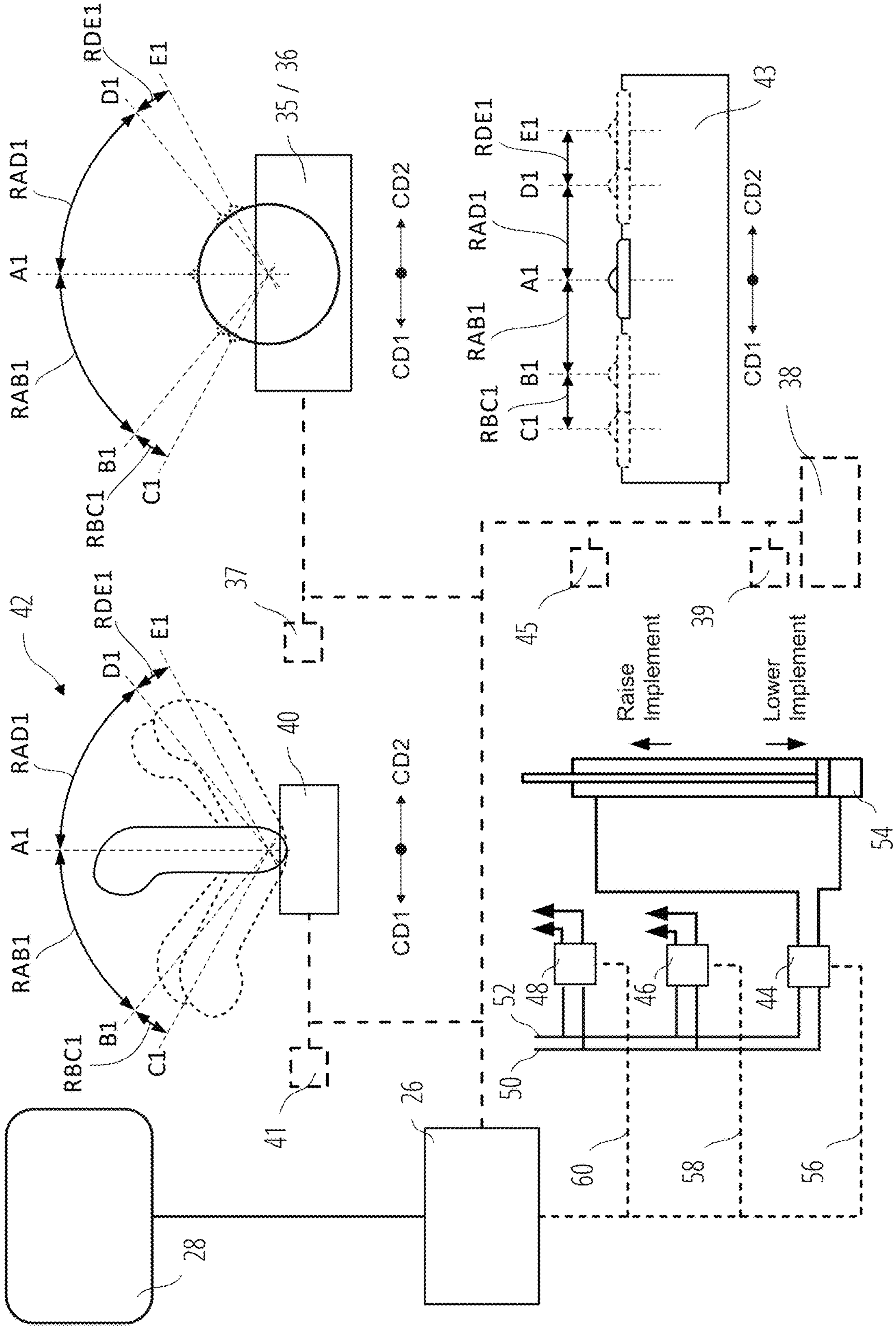
FIG. 4 illustrates a schematic comprising user-operable control devices for controlling motion drives.

With reference to FIG. 4, a control system 42 for controlling the motion drives is installed in the agricultural machine. The control system 42 comprises three dual port spool valves 44, 46, 48. Each valve 44, 46, 48 has two inputs connected to a high pressure hydraulic line 50 (feed by a hydraulic pump) and a low pressure hydraulic line 52 (or tank).

The motion drives can be of different types. Here, the motion drives are designed as hydraulic cylinders 54, 70, 74, 86, 88, 130 and 134 (see FIG. 1, FIG. 4, FIG. 13) providing a translational movement and as a hydraulic motor (spout drive 126) (see FIG. 9) providing a rotational movement. Instead, the hydraulic motion drives can be substituted by electromechanical motion drives comprising an electric motor and a gear drive, e. g. a spindle gear drive whereas the electric motor drives the spindle gear drive for transforming a rotational movement into a translational movement comparable to a translational movement of a hydraulic cylinder.

As can be seen in FIG. 4, the three valves 44, 46 and 48 of the control system 42 are used for connecting hydraulic motion drives, e. g. double-acting hydraulic cylinders. For reasons of clarity, only double-acting hydraulic cylinder 54 connected to valve 44 is shown whereas additional hydraulic motion drives are connected to the other valves 46 and 48. Double-acting cylinder 54 enables to pressurize both chambers of the cylinder so that the lifting and lowering of the hitch 20 is powered. Alternatively, hydraulic cylinder may be a single-acting cylinder in which only one chamber, preferably the one to lift the hitch 20, is pressurized. Lowering of the hitch 20 is then only provided by the weight of the first working component 22 attached thereto.

Each valve 44, 46, 48 serves to direct pressurized fluid from high pressure hydraulic line 50 to the respective hydraulic cylinders in order to either extend or retract the respective piston rods. To complete the hydraulic circuit during actuation, the valves 44, 46, 48 direct exhausted fluid to the low pressure hydraulic line 52. In the example shown in FIG. 4, each valve 44, 46, 48 is connected electrically by wires 56, 58, 60 (shown as dashed lines) to the ECU 26 to be electrically activated by a solenoid integrated in each valve 44, 46, 48.

Further, the ECU 26 is electrically connected with the operator controls 28 and thus with each user-operable control device of the operator controls 28. Thus for example, a rocker control device 40 (shown separately for reasons of clarity) is electrically connected to the ECU 26. The rocker control device 40 can be deflected around a pivot axis either side of a neutral position A1. The lever portion of the rocker control device 40 is suitably biased into the neutral position A1, e. g. by a mechanical spring.

As shown in FIG. 4, the operator controls 28 may comprise scroll wheel control devices 35, 36 connected electrically to ECU 26. Similar to the rocker control device 40, scroll wheel control devices 35, 36 can be deflected around a pivot axis either side of a neutral position A1. The wheel portion of the scroll wheel control devices 35, 36 may be suitably biased into the neutral position A1, e. g. by a spring.

As also shown in FIG. 4, the operator controls 28 may comprise a linear control device 43 as an additional user-operable control device providing a similar function as the scroll wheel control devices 35, 36 with the difference that the linear control device 43 is moved linear at either side of a neutral position A1 instead of a deflectional movement. The linear control device 43 may be suitably biased into the neutral position A1, e. g. by a spring. In the vicinity of said linear control device 43, a linear control device mode switch 45 may be provided.

So, regardless whether a user-operable control device is operated by a rotational or linear movement, the different user-operable control devices provide similar functionality as described above. A user-operable control device may be operated in a rearward or forward direction wherein the terms rearward and forward must be seen in relation to the driving direction of the vehicle indicated in FIG. 1 with arrow DD.

Depending on the movement of the user-operable control devices 35, 36, 38, 40 and 43, valves 44, 46, 48 are operated by the solenoid control to provide a respective oil flow to hydraulic cylinder 54.

As can be seen in FIG. 4, the lever portion of the rocker control device 40, the scroll wheel control devices 35, 36 or the linear control device 43 can be moved or operated along first and second control directions CD1 and CD2. When these user-operable control devices are operated, the user-operable control devices can be moved into different positions, indicated with A1, B1, C1, D1 and E1 to control valve 44 and hydraulic cylinder 54, wherein:

- Position A1 is the neutral position;
- position B1 is a first intermediate deflection position in first control direction CD1;
- position C1 is a first (forward) maximum deflection limit position in first control direction CD1;
- position D1 is a second intermediate deflection position in second control direction CD2; and
- position E1 is a second (rearward) maximum deflection limit position in second control direction CD2.

At position B1 and position D1, the user-operable control devices 35, 36, 40 and 43 provide a haptic feedback to the operator, for example in form of a haptic resistance, to indicate that the position B1 or D1 has been reached.

In-between these positions A1, B1, C1, D1 and E1, the user-operable control devices 35, 36, 40 and 43 provide operating ranges indicated with RAB1, RBC1, RAD1, RDE1, wherein:

- operating range RAB1 extends between the neutral position A1 and first intermediate deflection position B1 in first control direction CD1;
- operating range RBC1 extends between first intermediate deflection position B1 and first (forward) maximum deflection limit position C1 in first control direction CD1;
- operating range RAD1 extends between the neutral position A1 and second intermediate deflection position D1 in second control direction CD2; and
- operating range RDE1 extends between second intermediate deflection position D1 and second (rearward) maximum deflection limit position E1 in second control direction CD2.

For example, the user-operable control device can be moved in the first control direction CD1 from operating range RAB1 to operating range RBC1 (and back) or in the second control direction CD2 from operating range RAD1 to operating range RDE1 (and back). The neutral position A1 is between the operating range RAB1 and the operating range RAD1.

The hitch 20 driven by double-acting hydraulic cylinder 54 can be raised according to a deflection of one of the user-operable control devices 35, 36, 40, 43 in-between positions A1 and C1 of the first control direction CD1, or lowered according to a deflection of one of the user-operable control devices 35, 36, 40, 43 in-between positions A1 and E1 of the second control direction CD2. If the hydraulic cylinder 54 is a single-acting hydraulic cylinder, only first control direction CD1 is provided, and second direction CD2 can be omitted. As a consequence, only positions A1, B1, C1 are presented and accordingly, operating ranges RAB1 and RBC1. In this case, the hitch 20 is lifting the working component by actuation of one of the user-operable control devices while lowering is be provided only by the weight resting on hitch 20.

Settings for the user-operable control devices as the rocker control device 40, the scroll wheel control devices 35, 36 or the linear control device 43 can be defined by using the turn-and-press control device 29 or the touch-sensitive display 32 showing a graphical use interface (GUI) divided in different GUI portions 33*a* to 33*h*. Possible settings are shown with reference to FIG. 5 and explained below.

Figure 5:
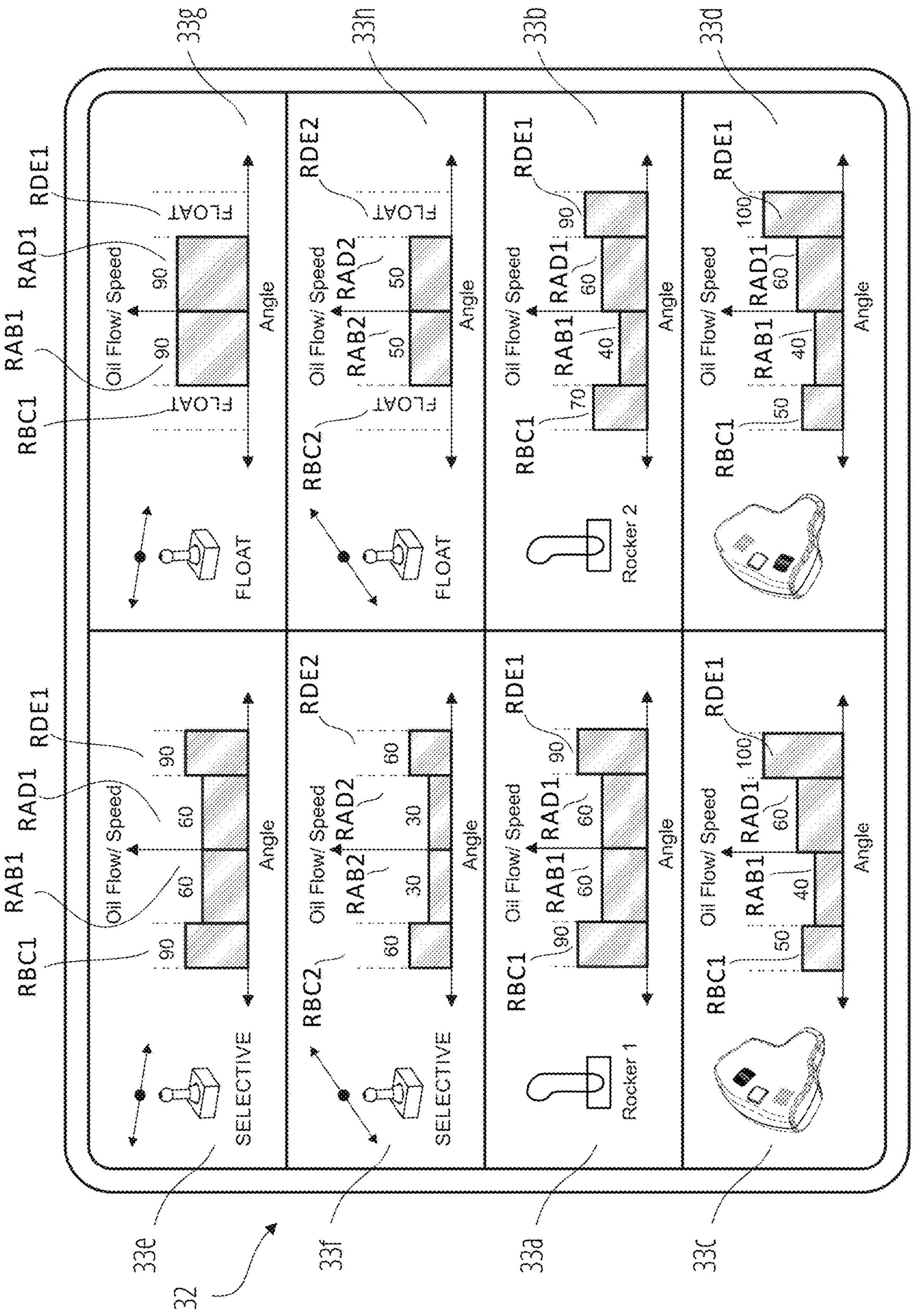
FIG. 5 illustrates different speed settings for different user-operable control devices.

With reference to FIG. 1, FIG. 4 and FIG. 5, a first vehicle operation, using the hitch 20, is now described. Prior to starting vehicle operation, the driver enters settings for the user-operable control devices. If the hydraulic cylinder 54 is to be operated by movement of one of the two rocker control devices 40, the operator may enter a menu in the display 32 to adjust the oil flow of the cylinder 54 for the operating ranges RAB1, RBC1, RAD1 and RDE1. As depicted in GUI portion 33*a* (see FIG. 5), the operator may set oil flow values in l/min for each operating range:

- operating range RAB1 is set to an oil flow of 60 l/min;
- operating range RBC1 is set to an oil flow of 90 l/min;
- operating range RAD1 is set to an oil flow of 60 l/min;
- operating range RDE1 is set to an oil flow of 90 l/min.

Hence, when the operator moves the user-operable control device in control direction CD1 in the operating range RAB1, the ECU 26 determines a speed demand of a constant oil flow of 60 l/min assigned to operating range RAB1 and controls the speed of the cylinder 54 accordingly. When the operator pushes the user-operable control device further in the operating range RBC1, the ECU 26 determines a speed demand of a constant oil flow of 90 l/min assigned to operating range RBC1 and controls the speed of the cylinder 54 accordingly. Thus, in response to a movement of the user-operable control device from the operating range RAB1 to operating range RBC1, the speed demand is increased in a first discrete step of 30 l/min from an oil flow of 60 l/min assigned to operating range RAB1 up to an oil flow of 90 l/min assigned to operating range RBC1. The same applies in response to a movement of the user-operable control device in control direction CD2 from the operating range RAD1 to operating range RDE1 wherein the speed demand is increased in a second discrete step of 30 l/min from an oil flow of 60 l/min assigned to operating range RAD1 up to an oil flow of 90 l/min assigned to operating range RDE1.

Here, both discrete steps have the same value of 30 l/min irrespectively the user-operable control device is moved in the first control direction CD1 from operating range RAB1 to RBC1 or in the second control direction CD2 from operating range RAD1 to RDE1. But the user-operable control device may be configured in such a way that the first and the second discrete steps have different values as exemplarily shown in GUI portion 33*c* and GUI portion 33*d* in FIG. 5.

If the other of the two rocker control devices 40 is chosen for controlling the hydraulic cylinder 54, the operator may enter the settings in GUI portion 33*b:* operating range RAB1 is set to an oil flow of 40 l/min;
operating range RBC1 is set to an oil flow of 70 l/min;
operating range RAD1 is set to an oil flow of 60 l/min;
operating range RDE1 is set to an oil flow of 90 l/min.

Hence, when the operator moves the user-operable control device in control direction CD1 in the operating range RAB1, the ECU 26 determines a speed demand of a constant oil flow of 40 l/min assigned to operating range RAB1 and controls the speed of the cylinder 54 accordingly. When the operator pushes the user-operable control device further in the operating range RBC1, the ECU 26 determines a speed demand of a constant oil flow of 70 l/min assigned to operating range RBC1 and controls the speed of the cylinder 54 accordingly. Thus, in response to a movement of the user-operable control device from the operating range RAB1 to operating range RBC1, the speed demand is increased in a discrete step from an oil flow of 40 l/min assigned to operating range RAB1 up to an oil flow of 70 l/min assigned to operating range RBC1. But the values of the oil flows will be different when the operator moves the user-operable control device in control direction CD2. Then, if user-operable control device is in the operating range RAB1, the ECU 26 determines a speed demand of a constant oil flow of 60 l/min assigned to operating range RAD1 and controls the speed of the cylinder 54 accordingly. When the operator pushes the user-operable control device further in the operating range RDE1, the ECU 26 determines a speed demand of a constant oil flow of 90 l/min assigned to operating range RDE1 and controls the speed of the cylinder 54 accordingly. Thus, in response to a movement of the user-operable control device from the operating range RAD1 to operating range RDE1, the speed demand is increased in a discrete step from an oil flow of 60 l/min assigned to operating range RAD1 up to an oil flow of 90 l/min assigned to operating range RDE1.

If the cylinder 54 is to be operated by movement of the scroll wheel control device 35, the operator may enter the settings for operating ranges in GUI portion 33*c* accordingly. If the cylinder 54 is to be operated by movement of scroll wheel control device 36, the operator may enter the settings for the operating ranges in GUI portion 33*d.*

The settings are then saved in memory 160 of the ECU 26. Alternatively, the settings as described above have already been saved during a previous operation so that the settings can be accessed by the ECU 26 via memory 160.

Figure 6:
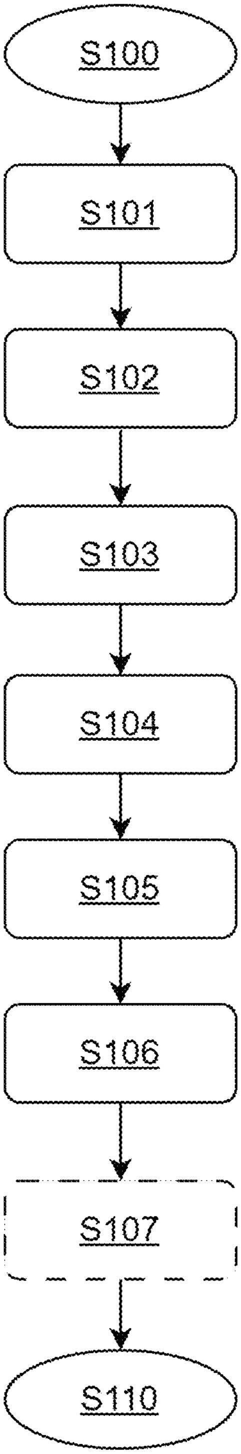
FIG. 6 shows a flowchart for a method executable by the ECU of FIG. 3.

FIG. 6 shows a flow chart of a method for controlling any working component disclosed in this application as for example the first working component 22. The method may be at least partly a computer-implemented method stored as a computer program product in the memory 160 of the electronic control unit (ECU) 26. The ECU 26 is configured to carry out the method. Computer-implemented parts of the method may be executed by the controller 159 of the ECU 26. The method is described by way of example of several steps without any restriction in respect of that steps. I. e. the number or the order of steps may be adapted, for example single steps may be excluded and/or added (such as optional step S107) and executed earlier or later than described.

After finishing settings, the operator can start the method (step S100). Firstly, the operator may couple the first working component 22 to the hitch 20. Therefore, the tractor 10 approaches the first working component 22 while the operator uses one of the user-operable control devices, for example rocker control device 40, to precisely position the hitch 20 to match with the coupling point of the first working component 22. During this operation, the operator uses the user-operable control device in operating ranges RAB1 or RAD1 for triggering a lower oil flow to enable precise positioning of the hitch 20. As mentioned above, the hitch 20 is raised by actuating the user-operable control device from the neutral position A1 in control direction CD1 and lowered by actuating the user-operable control device from the neutral position A1 in control direction CD2.

Based on these operator inputs, the ECU 26 determines a first speed demand dependent on the first current operating range RAB1 or RAD1 of the user-operable control device (step S101) and controls the speed of the motion drive, here cylinder 54, according to the first speed demand (step S102).

If the position of the hitch 20 matches with the coupling point of the first working component 22, the operator may preferably move the user-operable control device, e. g. rocker control device 40, to operating range RBC1 to trigger a higher oil flow for quickly lifting the first working component 22 off the ground 15 for transportation.

In response to this movement of the user-operable control device from the first operating range RAB1 to the second operating range RBC1, the ECU 26 determines a second speed demand dependent on the second current operating range RBC1 of the user-operable control device (step S103) and controls the speed of the motion drive, here cylinder 54, according to the second speed demand (step S104) wherein the first speed demand changes in a discrete step.

On the agricultural field, the operator slowly moves the first working component 22 down on or into ground 15 by moving one of the user-operable control devices, e. g. rocker control device 40 to the operating range RAD1 in a slow movement. When the first working component 22 is to be lifted from ground, e. g. when a stone is in the agricultural field, the operator moves the rocker control device 40 to operating range RBC1 to quickly lift the working component off the ground. So according to these operator inputs, method steps S101 to S104 will be repeated.

As a result, the operator can operate the hitch 20 with different oil flows without requiring to take hands off the user-operable control device, e. g. to change settings in the display 32. As the oil flow remains constant when the user-operable control device is moved within a specific operating range RAB1, RBC1, RAD1 or RDE1, an unintentional change of oil flow is avoided even if the user-operable control device is shaking when the agricultural machine runs on an uneven ground 15 or when shocks occur when pushing the second working component 23, e. g. a front end loader, into bulk material. Even if the shocks may be stronger, the haptic feedback of the user-operable control device provided at positions B1 and C1 may impede further unintentional changes.

Furthermore, in case of conscious movement, the operator receives a haptic feedback at positions B1 and C1 of the user-operable control device in which the oil flow may be increased or decreased. With the hand permanently remaining on the user-operable control device, the operator can fully concentrate on viewing the operation of the working component and does not need to look at the operator controls 28 to find the respective user-operable control device. So, operator comfort and safe operation of motion drives can be increased.

Figure 7:
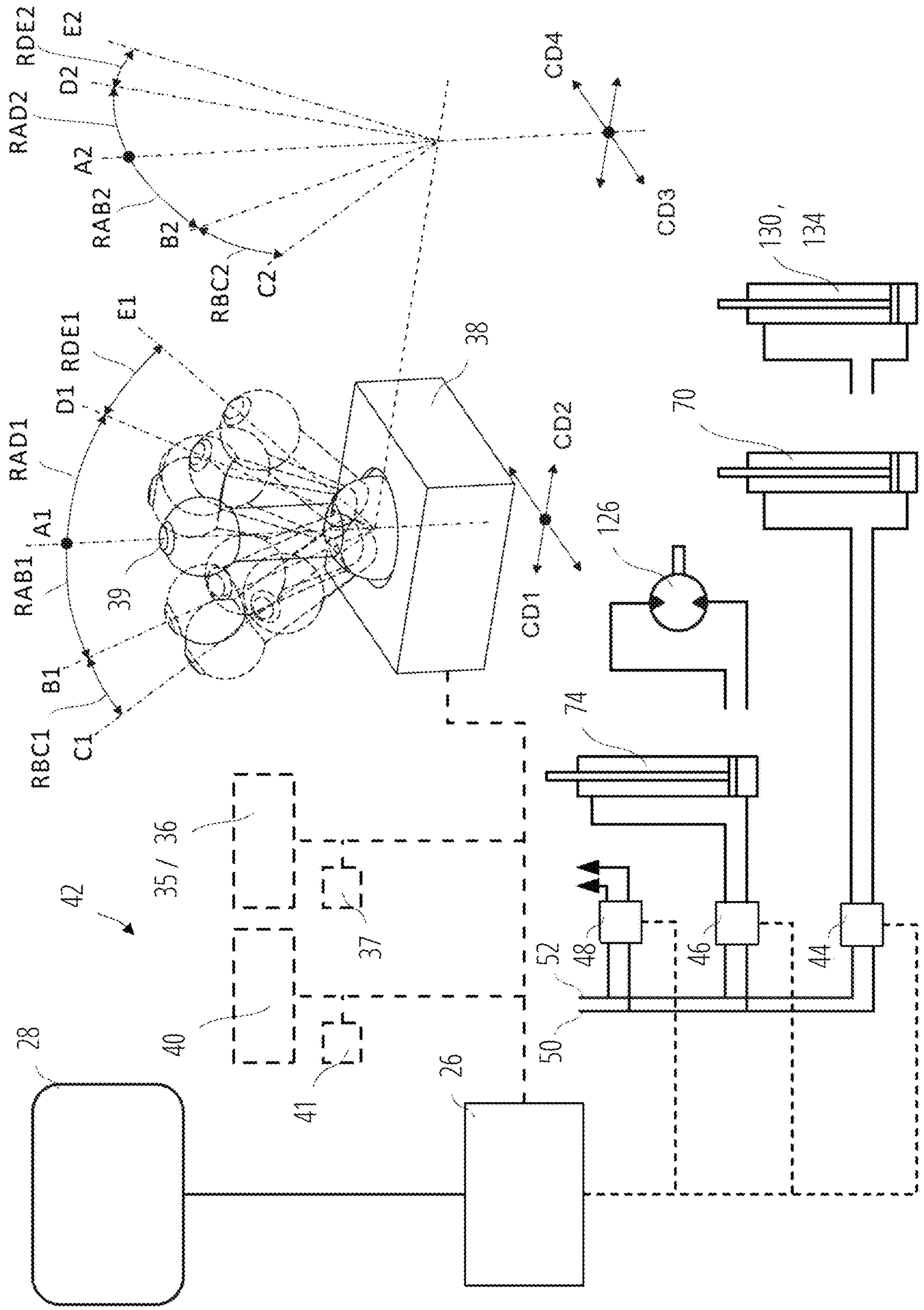
FIG. 7 illustrates a schematic comprising user-operable control devices and motion drives.

With reference to FIG. 1 and FIG. 7, the control system 42 is now described by way of an example of operating the second working component 23 designed as a front end loader comprising a tool holder 72 and a tool 75 (see FIG. 1), whereby FIG. 7 is a similar schematically representation of the control system 42 as described in FIG. 4. Where the same numerals are used, these are not explained in detail again.

For operating the second working component 23, the cross-gate control device 38 can be operated to provide control to

- valve 44 fluidically connected to a hydraulic boom cylinder 70 for lifting and lowering the tool holder 72 of the second working component 23, and
- valve 46 fluidically connected to a hydraulic tool cylinder 74 to pivot tool 75, exemplarily designed as a shovel.

A parallel guidance for the tool 75 can be used so that the tool 75 remains in the previously orientation (to ground or vehicle driving direction DD) even if the tool holder 72 is moved.

As can be seen in FIG. 7, the lever portion of the cross-gate control device 38 can be moved, similarly to rocker control device 40, the scroll wheel control devices 35, 36 or linear control device 43, along a first and second control direction CD1 and CD2 into different positions to control valve 44 and thereby boom cylinder 70, and additionally along a third and fourth control direction DC3 and CD4 into different positions to control valve 46 and thereby tool cylinder 74. The cross-gate control device 38 is operable in the first and second control directions CD1 and CD2, so that the cross-gate control device 38 can be moved into different positions, indicated with A1, B1, C1, D1 and E1 to control the valve 44 and boom cylinder 70, wherein:

- Position A1 is the neutral position;
- position B1 is a first intermediate deflection position in first control direction CD1;
- position C1 is a first (forward) maximum deflection limit position in first control direction CD1;
- position D1 is a second intermediate deflection position in second control direction CD2; and
- position E1 is a second (rearward) maximum deflection limit position in second control direction CD2.

At position B1 and position D1, the cross-gate control device 38 provides a haptic feedback to the operator, for example in form of a haptic resistance, to indicate that the position B1 or D1 has been reached.

In-between these positions A1, B1, C1, D1 and E1, the cross-gate control device 38 provides operating ranges indicated with RAB1, RBC1, RCD1, RDE1, wherein:

- operating range RAB1 extends between the neutral position A1 and first intermediate deflection position B1 in first control direction CD1;
- operating range RBC1 extends between first intermediate deflection position B1 and first (forward) maximum deflection limit position C1 in first control direction CD1;
- operating range RAD1 extends between the neutral position A1 and second intermediate deflection position D1 in second control direction CD2; and
- operating range RDE1 extends between second intermediate deflection position D1 and second (rearward) maximum deflection limit position E1 in second control direction CD2.

In addition, the cross-gate control device 38 is operable in a third and fourth control direction CD3 and CD4, so that the cross-gate control device 38 can be moved into different positions, indicated with A2, B2, C2, D2 and E2 to control the valve 46 and tool cylinder 74, wherein:

- Position A2 is the neutral position;
- position B2 is a first intermediate deflection position in third control direction CD3;
- position C2 is a first (forward) maximum deflection limit position in third control direction CD3;
- position D2 is a second intermediate deflection position in fourth control direction CD4; and
- position E2 is a second (rearward) maximum deflection limit position in fourth control direction CD4.

Hence, the user-operable control device can be moved in the first control direction CD1 from operating range RAB1 to operating range RBC1 (and back) or in the second operating control direction CD2 from operating range RAD1 to operating range RDE1 (and back) to control valve 44 and cylinder 70. Additionally, the user-operable control device can be moved in third control direction CD3 from operating range RAB2 to operating range RBC2 (and back) or in fourth control direction CD4 from RAD2 to RDE2 (and back) wherein third and fourth control directions CD3 and CD4 are oriented laterally to the first and second control directions CD1 and CD2 to control valve 46 and cylinder 74 (see FIG. 7).

At position B2 and position D2, the cross-gate control device 38 provides a haptic feedback to the operator, for example in form of a haptic resistance, to indicate that the position B2 or D2 has been reached.

In-between these positions A2, B2, C2, D2 and E2, the cross-gate control device 38 provides operating ranges indicated with RAB2, RBC2, RCD2, RDE2, wherein:

- operating range RAB2 extends between the neutral position A2 and first intermediate deflection position B2 in third control direction CD3;
- operating range RBC2 extends between first intermediate deflection position B2 and first (forward) maximum deflection limit position C2 in third control direction CD3;
- operating range RAD2 extends between the neutral position A2 and second intermediate deflection position D2 in fourth control direction CD4; and
- operating range RDE2 extends between second intermediate deflection position D2 and second (rearward) maximum deflection limit position E2 in fourth control direction CD4.

Prior to starting an operation of the second working component 23, the operator may enter settings for the cross-gate control device 38 by entering a menu in the display 32 to adjust the oil flow for the cylinder 70 and cylinder 74. Operating ranges RAB1, RBC1, RCD1, RDE1 are assigned to valve 44 and cylinder 70 and operating ranges RAB2, RBC2, RAD2 and RDE2 are assigned to valve 46 and cylinder 74.

As the second working component 23 is advantageously operated in two operating modes selectable by pushing cross-gate mode switch 39, a first setting is necessary for a first mode, also referred to as the SELECTIVE mode, for selecting different oil flows for each operating range RAB1, RBC1, RCD1, RDE1. So, the operator firstly adjusts the oil flow for operating range RAB1, RBC1, RAD1 and RDE1 in the SELECTIVE mode. As depicted with GUI portion 33*e* (see FIG. 5), the operator may set oil flow values in l/min for each operating range:

Operating range RAB1 is set to an oil flow of 60 l/min;
Operating range RBC1 is set to an oil flow of 90 l/min;
Operating range RAD1 is set to an oil flow of 60 l/min;
Operating range RDE1 is set to an oil flow of 90 l/min.

Since the settings of GUI portion 33*e* correspond to the settings of GUI portion 33*a*, the settings of GUI portion 33*e* have the same effect on the control of the motion drive. Thus, in response to a movement of the user-operable control device from the operating range RAB1 to operating range RBC1, the speed demand is increased in a first discrete step of 30 l/min from an oil flow of 60 l/min assigned to operating range RAB1 up to an oil flow of 90 l/min assigned to operating range RBC1. So, method steps S101 to S104 will be executed by the ECU 26 analogously as described above.

The same applies in response to a movement of the user-operable control device in control direction CD2 from the operating range RAD1 to operating range RDE1 wherein the speed demand is increased in a second discrete step of 30 l/min from an oil flow of 60 l/min assigned to operating range RAD1 up to an oil flow of 90 l/min assigned to operating range RDE1. So, method steps S101 to S104 will be repeated by the ECU 26 analogously for the operating ranges RAD1 and RDE1.

Analogously to the operating ranges RAB1, RBC1, RCD1, RDE1, the operator may enter settings for the operating ranges RAB2, RBC2, RAD2 and RDE2. The operator may choose a lower oil flow for the cylinder 74 compared to cylinder 70 to avoid excessive jerking, e. g. when using a pallet fork as the tool 75 connected with cylinder 74 (see FIG. 1). As depicted with GUI portion 33*f* (see FIG. 5), the operator may set oil flow values in l/min for each operating range:

Operating range RAB2 is set to an oil flow of 30 l/min;
Operating range RBC2 is set to an oil flow of 60 l/min;
Operating range RAD2 is set to an oil flow of 30 l/min;
Operating range RDE2 is set to an oil flow of 60 l/min.

Hence, when the operator moves the user-operable control device in control direction CD3 in the operating range RAB2, the ECU 26 determines a speed demand of a constant oil flow of 30 l/min assigned to operating range RAB2 and controls the speed of the cylinder 74 accordingly. When the operator pushes the user-operable control device further in the operating range RBC2, the ECU 26 determines a speed demand of a constant oil flow of 60 l/min assigned to operating range RBC2 and controls the speed of the cylinder 74 accordingly. Thus, in response to a movement of the user-operable control device from the operating range RAB2 to operating range RBC2, the speed demand is increased in a third discrete step of 30 l/min from an oil flow of 30 l/min assigned to operating range RAB2 up to an oil flow of 60 l/min assigned to operating range RBC2. So, method steps S101 to S104 will be repeated by the ECU 26 analogously for the operatng ranges RAB2 and RBC2.

The same applies in response to a movement of the user-operable control device in control direction CD4 from the operating range RAD2 to operating range RDE2 wherein the speed demand is increased in a fourth discrete step of 30 l/min from an oil flow of 30 l/min assigned to operating range RAD2 up to an oil flow of 60 l/min assigned to operating range RDE2. So, method steps S101 to S104 will be repeated by the ECU 26 analogously for the operating ranges RAD2 and RDE2.

Here, the third and fourth discrete steps have the same value of 30 l/min irrespectively the user-operable control device is moved in the third control direction CD3 from operating range RAB2 to RBC2 or in the fourth control direction CD4 from operating range RAD2 to RDE2. But the user-operable control device may be configured in such a way that the third and the fourth discrete steps have different values as exemplarily shown in GUI portion 33*c* and GUI portion 33*d* in FIG. 5.

Next to the SELECTIVE mode, a second setting is necessary for a second mode, also referred to as floating mode or also called FLOAT mode. The operator firstly adjusts the oil flow for operating range RAB1 and RAD1 only. In the FLOAT mode, operating ranges RBC1 and RDE1 are not adjustable since operating range RBC1 and RDE1 adjust valve 44 into a floating position in which external forces (e. g. by weight or ground contact) can freely move the tool holder 72. As depicted with GUI portion 33*g* (see FIG. 5), the operator may set oil flow values in l/min for operating range:

Operating range RAB1 is set to an oil flow of 90 l/min;
Operating range RAD1 is set to an oil flow of 90 l/min.

Similarly, the operator may enter settings for the operating ranges RAB2 and RDE2 only. In the FLOAT mode, operating range RBC2 and RDE2 are not adjustable since operating ranges RBC2 and RDE2 adjust valve 46 into a floating position in which external forces (e. g. by weight or ground contact) can freely move the tool 75. As depicted with GUI portion 33*h* (see FIG. 5), the operator may set oil flow values in l/min for each operating range:

Operating range RAB2 is set to an oil flow of 50 l/min;
Operating range RAD2 is set to an oil flow of 50 l/min.

For the FLOAT mode, the operator has chosen higher oil flow values as this mode is mostly used when no load is carried. The settings are then saved in memory 160 of the ECU 26. Alternatively, the settings as described above have already been saved during a previous operation, so that the settings can be accessed by the ECU 26 via memory 160. After settings have been completed, the operator may start an operation with the second working component 23, here front end loader, as described above.

Hence in case of an active FLOAT mode, when the operator moves the user-operable control device in control direction CD1 in the operating range RAB1, the ECU 26 determines a speed demand of a constant oil flow of 90 l/min assigned to operating range RAB1 and controls the speed of the cylinder 70 accordingly. When the operator pushes the user-operable control device further in the operating range RBC1, the ECU 26 determines a FLOAT demand assigned to operating range RBC1 and controls the cylinder 70 accordingly. Analogously, when the operator moves the user-operable control device in control direction CD3 in the operating range RAB2, the ECU 26 determines a speed demand of a constant oil flow of 50 l/min assigned to operating range RAB2 and controls the speed of the cylinder 74 accordingly. When the operator pushes the user-operable control device further in the operating range RBC2, the ECU 26 determines a FLOAT demand assigned to operating range RBC2 and controls the cylinder 74 accordingly.

So, depending on whether FLOAT mode or SELECTIVE mode is active, the ECU 26 is configured to determine different demands for the same operating range. As shown by the GUI portion 33*e* and GUI portion 33*g*, the speed values assigned to operating ranges RAB1 and RAD1 are higher for the FLOAT mode than for the SELECTIVE mode. The same applies to the operating ranges RAB2 and RAD2 as shown by the GUI portions 33*f* and 33*h*.

The operator firstly selects the mode SELECTIVE or FLOAT by pushing cross-gate mode switch 39. Based on this selection, the ECU 26 activates the corresponding mode for the operating ranges of both first/second control direction CD1/CD2 and third/fourth control direction CD3/CD4 (step S105). Alternatively, the mode may be selected for first/second control direction CD1/CD2 and third/fourth control direction CD3/CD4 by an additional cross-gate mode switch 47 (see FIG. 2). Further, the display 32 may show the mode which is currently selected. For example, the respective active GUI portion (see FIG. 5) may be highlighted (e. g. by colour or shading) or the respective GUI portion may be hidden when the mode is inactive.

For positioning the second working component 23 quickly at a certain height, for example at position 24*a* applicable for driving the tractor 10 to bulk material to be loaded as exemplarily shown in FIG. 1, the operator selects the SELECTIVE mode first and moves the cross-gate control device 38 within the operating ranges RBC1 or RDE1 to move tool holder 72 quickly up and down. When the bulk material is reached, the operator moves the cross-gate control device 38 within the operating ranges RAB1 or RAD1 to precisely position the tool holder 72 at a height suitable for loading the tool 75, e. g. the shovel. Then, the operator moves the cross-gate control device 38 within the operating ranges RAB2 or RAD2 to smoothly pivot the tool 75 to a horizontal position as indicated by position 76*a*. The tool 75 is then pushed into the material.

If the tool 75 is fully loaded, the operator moves the cross-gate control device 38 within the operating ranges RAB1 and RAD1 to slightly lift the tool holder 72 and further within the operating ranges RAB2 or RAD2 to pivot the tool 75 to a slightly inclined position as indicated by position 76*b* to avoid loss of material during fast driving. Then, the tractor 10 drives away to a place for unloading. If the bulk material is to be loaded e. g. in a dumper truck, the operator moves the cross-gate control device 38 within the operating ranges RBC1 or RDE1 to quickly adjust the position of the tool holder 72 from the position 24*a* to a higher height as indicated by position 24*c* to be positioned over a tipping body of the dumper truck. With the tool 75 still in position 76*b*, the operator then moves the cross-gate control device 38 within the operating ranges RBC2 or RDE2 to quickly position the tool 75 from position 76*b* to a maximum unloading position indicated by position 76*c*. Alternatively, the operator can move the cross-gate control device 38 within the operating ranges RAB2 or RAD2 to smoothly unload tool 75 in an slightly downwards position as indicated by position 76*d*. The loading process is then started again.

In general, if precise positioning is needed, the operator can select the operating ranges RAB1, RAD1, RAB2 or RAD2 to slowly operate the tool holder 72 or the tool 75 with low oil flow and, if fast movement is required, the operating ranges RBC1, RDE1, RBC2 or RDE2 to operate the tool holder 72 or the tool 75 with high oil flow. As the operator can select the different operating ranges without taking hands off, this is very comfortable. As the operating ranges with higher oil flow will be reached when the haptic feedback at positions B1, D1, B2, D2 has been overcome, unintentional increase of speed can be avoided. The operator can fully concentrate on the loader operation and does not need to adjust settings in the display 32.

If the bulk material must be scraped from ground 15, the operator may switch to the FLOAT mode by using cross-gate mode switch 39 directly on cross-gate control device 38 without taking hands off. Since the oil flow values for the operating ranges RAB1, RAD1, RAB2 and RAD2 in FLOAT mode are higher compared to the oil flow values for the same operating ranges in SELECTIVE mode as can be seen in the respective GUI portions 33*g* and 33*h* assigned to the FLOAT mode and the respective GUI portions 33*e* and 33*f* assigned to the SELECTIVE mode, the tool holder 72 and together with the tool 75 can be quickly moved close to ground 15 (see position 24*b* of the tool holder 72 in FIG. 1). If the operator now further moves the cross-gate control device 38 to one of the operating ranges RBC1, RDE1, RBC2 or RDE2, floating function of valves 44 and 46 enable the tool 75 to touch the ground 15 and align with the ground 15 just by the weight of the tool holder 72 and the tool 75. Loading the tool 75 can then be proceeded. When the tool 75 is fully loaded, the operator resets SELECTIVE mode by pressing the cross-gate mode switch 39 and moves the cross-gate control device 38 within the operating ranges RAB1 and RAD1 to slightly lift tool holder 72 and further within the operating ranges RAB2 and RAD2 to pivot the tool 75 to a slightly inclined position as indicated by position 76*b* to avoid loss of material during fast driving. Further proceeding of unloading is as described above and therefore not described hereinafter.

It is envisaged that the provision of cross-gate mode switch 39 on cross-gate control device 38 to select between different operating modes, herein FLOAT mode and SELECTIVE mode, also enables the operator to change the dynamic behavior of the second working component 23 without taking hands off to provide a further improvement in terms of comfort and safety.

Figure 8:
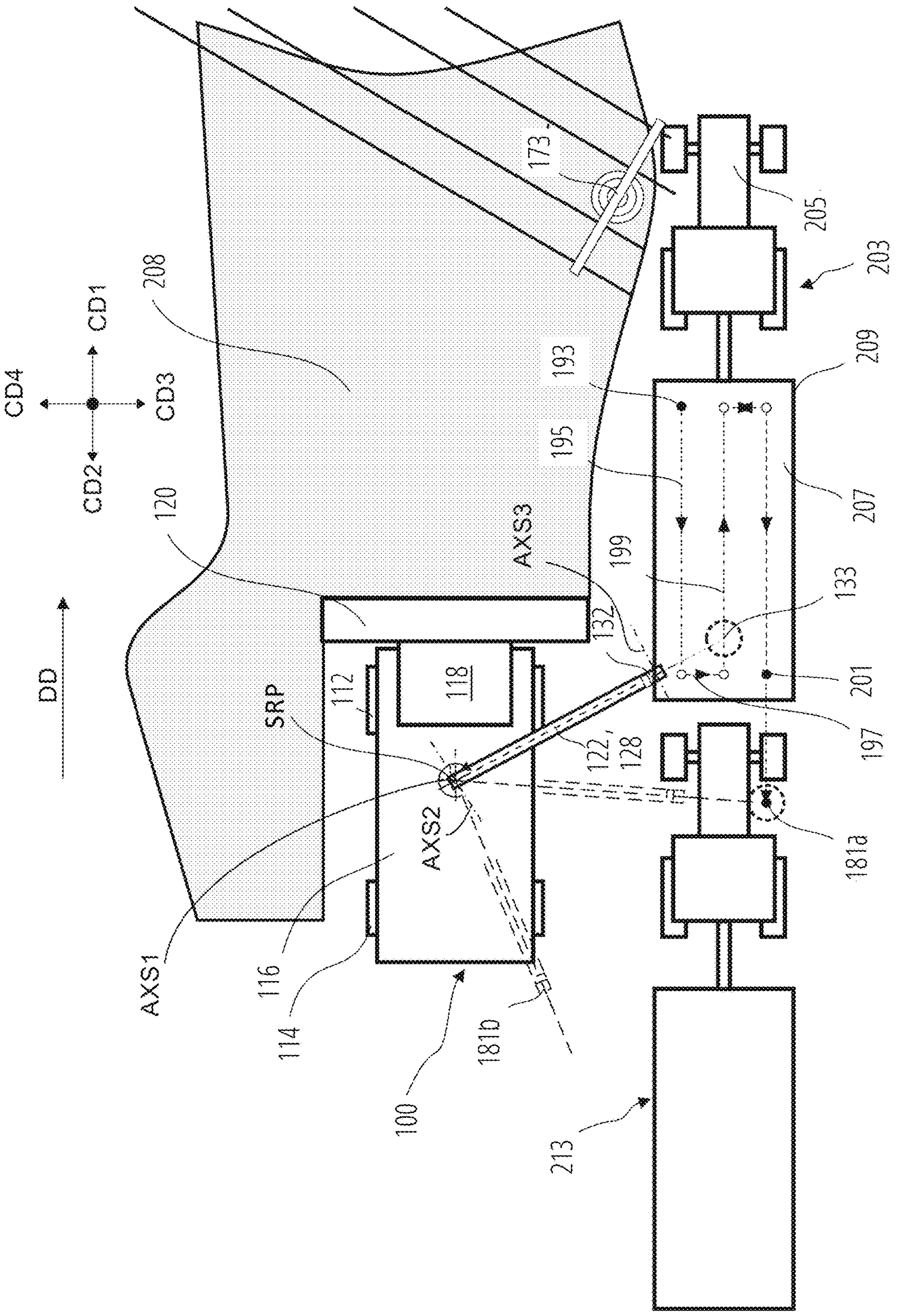
FIG. 8 illustrates an unloading operation of a forage harvester.
Figure 10:
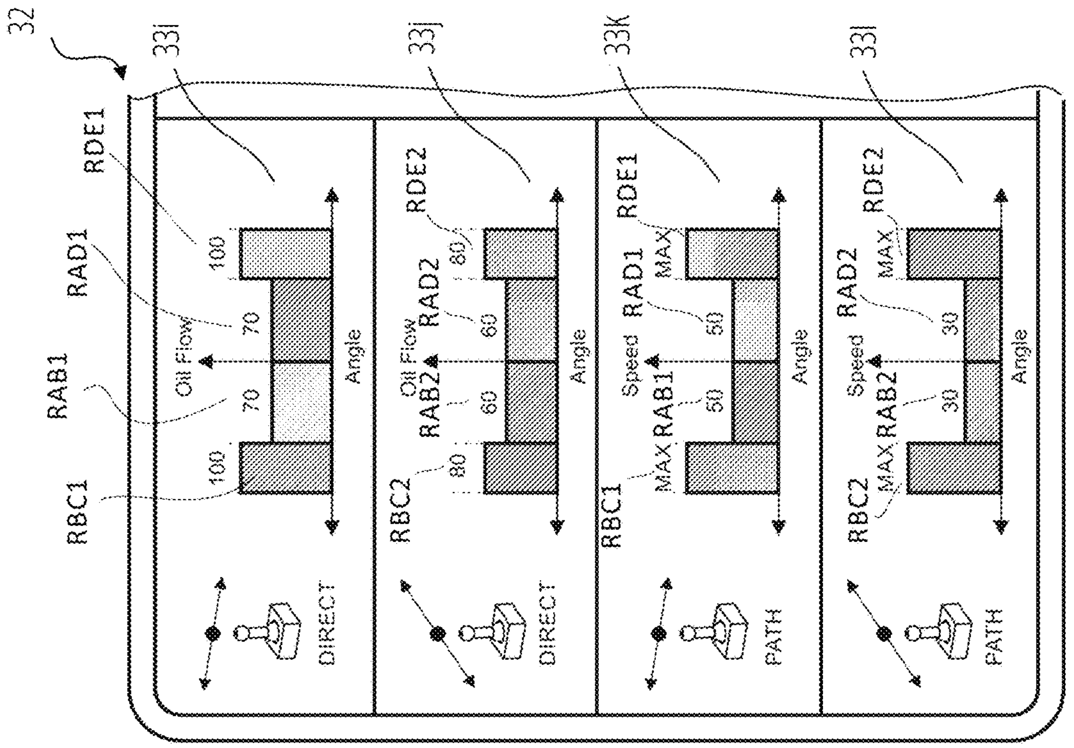
FIG. 10 illustrates speed settings for an user-operable control device.
Figure 9:
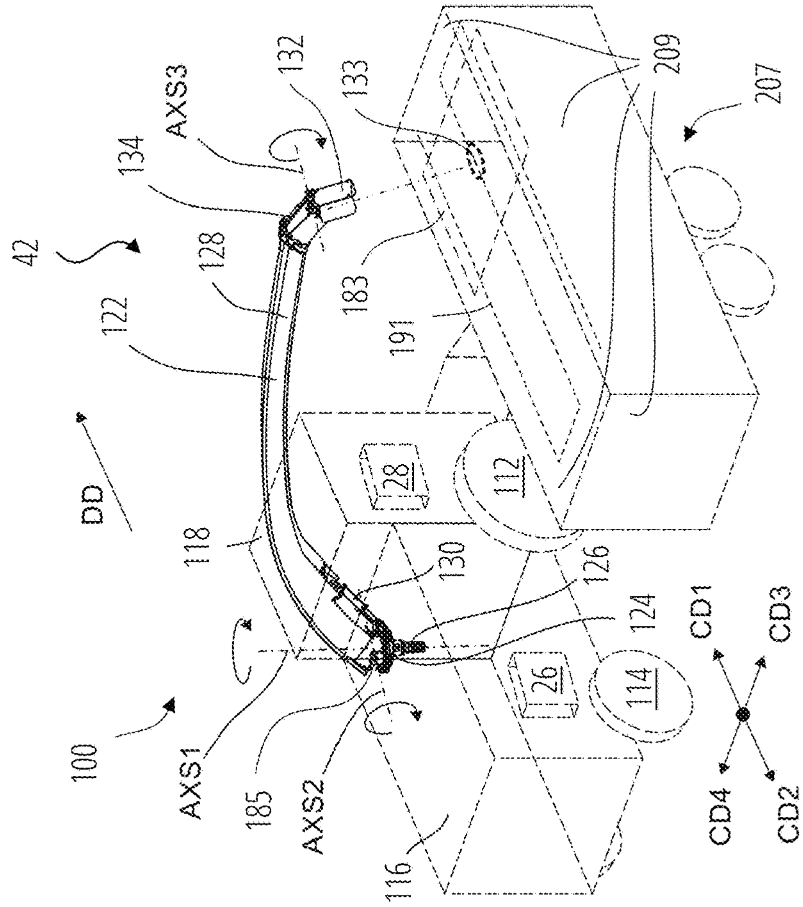
FIG. 9 illustrates the unloading operation of a forage harvester from a perspective view.

A further operation is now described referring to an agricultural machine in the form of a forage harvester 100 as depicted in FIG. 8 and FIG. 9. Reference is also taken to FIG. 7 and FIG. 10. The forage harvester 100 is used to harvest crop (e. g. grass or maize) on an agricultural field. The forage harvester 100 comprises front wheels 112, rear wheels 114, an engine section 116 and a cab section 118. Growing crop 208 is cut with header 120 and fed into different processing means such as a chopper drum or a cracker unit installed within engine section 116. Such processing means are described in patent publication WO 2012/010396 A1, published 26 Jan. 2012, by AGCO International GmbH. After passing the processing means the crop is discharged through a spout assembly 122. Such a spout assembly is described in patent publication WO 2012/022564 A1, published 23 Feb. 2012, by AGCO International GmbH.

With reference to FIG. 8 and FIG. 9, an agricultural machine exemplarily illustrated in the form of a forage harvester 100 is shown. Analogously to tractor 10, the forage harvester 100 comprises ECU 26, operator controls 28, control system 42 (see FIG. 9) and a working component in the form of a spout assembly 122. The spout assembly 122 comprises a spout base 124 rotatably mounted on an engine section 116, a motion drive in terms of a rotational hydraulic spout drive 126, a further motion drive in terms of hydraulic spout bow cylinder 130, a spout flap 132 and an additional motion drive in terms of hydraulic spout flap cylinder 134. For rotation, the rotational hydraulic spout drive 126 in form of a hydraulic motor is supplied for rotating the spout base 124 around vertical spout axis indicated with AXS1. On the spout base 124, the spout bow 128 is rotatably mounted to be rotated by means of the hydraulic spout bow cylinder 130 about horizontal spout axis indicated with AXS2 to be lifted or lowered accordingly. At the opposite end of spout bow 128, the spout flap 132 is rotatably mounted to be rotated by means of the hydraulic spout flap cylinder 134 about horizontal spout axis indicated with AXS3 to adjust the discharge of the crop as described further below.

With reference to FIG. 8, for overloading crop, forage harvester 100 drives parallel with a further agricultural machine 203, for example a loading vehicle combination, which may comprise a tractor 205 and a loading wagon 207. Tractor 205 is of the same type as tractor 10. The operator needs to control the header 120 and in parallel the working component, i. e. spout assembly 122, so that the crop is discharged into loading wagon 207 correctly. The operator of the forage harvester 100 uses the operator controls 28 with the user-operable control devices as described with reference to FIG. 4 and FIG. 7. Compared to the tractor 10, the control system 42 of the forage harvester 100 is analogously used for the unloading process, in the following described with reference to FIG. 4, FIG. 7, FIG. 8, FIG. 9 and FIG. 10 using the same numerals as described for the tractor 10, especially in FIG. 4 and FIG. 7.

The overloading or unloading operation can be proceeded in two different operating modes: In a DIRECT mode, the operator directly manipulates the oil flow to the rotational hydraulic spout drive 126 for vertically rotating spout bow 128 about the axis AXS1 and to a hydraulic spout flap cylinder 134 (see FIG. 7, FIG. 9) for pivoting the spout flap 132 about the axis AXS3. During overloading, the hydraulic spout bow cylinder 130 to rotate spout bow 128 relative to spout base 124 about horizontal spout axis AXS2 is rarely used as this motion drive mainly serves to adjust the height of the spout flap 132 over ground which may be adapted to the height of one or more loading wagons 207. As the heights of the various loading wagons 207 should not change to much in a harvesting campaign, this is more an adjustment done prior to harvesting and unloading. Hence, it is envisaged that the operator of the forage harvester 100 needs to control two motion drives to provide correct overloading.

For the DIRECT mode, the operator may use two adjacent rocker control devices 40, two scroll wheel control devices 35, 36 on drive lever 34 or two adjacent linear control devices 43 as shown in FIG. 4 to control the hydraulic spout drive 126 and the hydraulic cylinder 134 to keep a virtual target point 133 (see FIG. 8 and FIG. 9) within a loading space of the loading wagon 207. The virtual target point 133 can also be seen as the centre of an area in which the crop stream is discharged into loading wagon 207. More preferably, the operator uses cross-gate control device 38 as this device provides easy control of two motion drives with one user-operable control device rather than two separate devices. Therefore, further reference is taken to FIG. 7 depicting the cross-gate control device 38 and the control system 42 operated thereby. Considering that the area in which the spout assembly 122 can be moved is limited and cannot cover the complete geometry of a loading wagon 207, the agricultural machine 203 must be moved relative to forage harvester 100 to enable full unloading during the unloading process. So, the operator of the forage harvester 100 must additionally communicate with an operator of the agricultural machine 203 to change relative positioning and track with the spout assembly 122. Since the operator of the forage harvester 100 also needs to control the header 120 and the area in front of it, the operator needs to do several tasks simultaneously.

Facing this and as the DIRECT mode requires a permanent coordination of the movement of the spout bow 128 (by moving cross-gate control device 38 in first or second direction CD1 or CD2) and the spout flap 132 (by moving cross-gate control device 38 in third or fourth direction CD3 or CD4) to keep the virtual target point 133 within the loading space of loading wagon 207, an additional mode is available to increase operator comfort. In this mode, referred to as PATH mode, the operator is released from permanent coordination of the movement of the spout bow 128 and the spout flap 132 as described hereinafter:

Initially the operator may position the spout assembly 122 to match target point 133 with path start point 193 in DIRECT mode. The operator of the forage harvester 100 then may switch to PATH mode by pushing cross-gate mode switch 39. The activation of PATH mode chances the control of the spout assembly 122 in that the ECU 26 now controls rotational hydraulic spout drive 126, hydraulic spout bow cylinder 130 and hydraulic spout flap cylinder 134 to guide the virtual target point 133 along a crop discharge path 191 and perpendicular to driving direction DD. Doing so, an element of the working component, here the spout flap of the spout assembly 122 is moved parallel and lateral to the driving direction DD. As shown in FIG. 9, the virtual target point 133 is thereby defined to be at a pre-determined virtual plane 183 parallel to and over ground 15 which should ideally be below the maximum height of the tailgates 209 of the loading wagon 207 to ensure that the target point 133 lies within the loading wagon 207 to be filled and no crop is thrown over the tailgates 209.

If the operator now pushes lever of cross-gate control device 38 in second direction CD2 (e. g. in operating range RAD1), the spout flap 132 would be moved parallel to driving direction DD. Thus, target point 133 would be moved along path portion 195 also being parallel to driving direction DD. At the end of the path portion 195, operator would move the cross-gate control device 38 in third direction CD3 (e. g. in operating range RAB2) to move the spout flap 132 lateral to the driving direction DD. Thus, the target point 133 will be moved along a path portion 197 being perpendicular to driving direction DD. At the end of the path portion 197, the operator would move the cross-gate control device 38 in first direction CD1 (e. g. in operating range RAB1) to move the spout flap 132 parallel to driving direction DD again. Thus, the target point 133 will move along a path portion 199 being aligned with driving direction DD. In this way, the operator can move the spout flap 132 as well as the target point 133 along a S-shaped crop discharge path 191 until end point 201 is reached by the target point 133. During this process, the ECU 26 determines the control signals for the rotational hydraulic spout drive 126, the hydraulic spout bow cylinder 130 and the hydraulic spout flap cylinder 134 according to a kinematic model based on a spout reference point 185 aligned with axis AXS1 (and on defined height) and the geometric properties of the spout assembly 122, the settings of target point 133 on virtual plane 183. Other than in DIRECT mode, following the crop discharge path 191 in PATH mode requires simultaneous control of the rotational hydraulic spout drive 126, the hydraulic spout bow cylinder 130 and the hydraulic spout flap cylinder 134 provided by ECU 26.

The operator can adjust oil flow or speed settings for the PATH mode and the DIRECT mode to increase comfort. With reference to FIG. 10 depicting a portion of the display 32, the operator can input the settings for both modes, DIRECT and PATH mode to enable speed variations for the unloading operation. Prior to starting the harvesting operation, the operator may enter settings for the cross-gate control device 38 by entering a menu in the display 32 to adjust the oil flow. So, the operator may firstly adjust the oil flow for the operating ranges RAB1, RBC1, RAD1 and RDE1 and the operating ranges RAB2, RBC2, RAD2 and RDE2 for the DIRECT mode as depicted in the GUI portions 33*i* and 33*j*:

Operating range RAB1 is set to an oil flow of 70 l/min;
Operating range RBC1 is set to an oil flow of 100 l/min;
Operating range RAD1 is set to an oil flow of 70 l/min;
Operating range RDE1 is set to an oil flow of 100 l/min;
Operating range RAB2 is set to an oil flow of 60 l/min;
Operating range RBC2 is set to an oil flow of 80 l/min;
Operating range RAD2 is set to an oil flow of 60 l/min;
Operating range RDE2 is set to an oil flow of 80 l/min.

So, the operator may have chosen a lower oil flow for the spout flap cylinder 134 preferably to ease precise positioning of target point 133 in this mode (see GUI portion 33*j*).

Additionally, operating ranges RAB1, RBC1, RAD1 and RDE1 and operating ranges RAB2, RBC2, RAD2 and RDE2 for PATH mode are set as depicted in GUI portions 33*k* and 33*l*. In contrast to the kinematic model for simultaneous control of the rotational hydraulic spout drive 126, the hydraulic spout bow cylinder 130 and the hydraulic spout flap cylinder 134 used by the ECU 26 for moving the target point 133 along the crop discharge path 191 as described before, the operator does not directly impact on the oil flow in the PATH mode. Thus, the operator may enter relative speed values as percentage values in respect of the maximum speed instead of absolute oil flow values:

Operating range RAB1 is set to a speed value of 50% of maximum speed;
Operating range RBC1 is set to maximum speed;
Operating range RAD1 is set to a speed value of 50% of maximum speed;
Operating range RDE1 is set to maximum speed;
Operating range RAB2 is set to a speed value of 30% of maximum speed;
Operating range RBC2 is set to maximum speed;
Operating range RAD2 is set to a speed value of 30% of maximum speed;
Operating range RDE2 is set to maximum speed.

The operator may have chosen a lower oil flow for operating ranges in the third and fourth control directions CD3 and CD4 as the transverse positioning along crop discharge path 191 requires finer positioning over smaller distances. With the settings adjusted, the operator can start harvesting operation.

With the operating ranges RAB1, RAD1, RAB2 or RAD2 pre-set with lower oil flow in both DIRECT and PATH mode (see FIG. 10), the operator will be enabled to smoothly control positioning of target point 133 freely or along crop discharge path 191. If faster positioning is required, e. g. when the agricultural machine 203 changes relative position to forage harvester 100 or when a transfer to a next following agricultural machine 213 (see FIG. 8) is necessary, operating ranges RBC1, RDE1, RBC2 and RDE2 with higher oil flow enable the operator to accelerate positioning of the spout assembly 122 and the target point 133 in direction to position 181*a* during the unloading of crop so that the fast positioning avoids crop loses or discharging crop on the tractor 205. Furthermore, the operator may recognize that the loading wagon 207 is not filled evenly due to variations in crop throughput (resulting from crop growth variations) and wants to quickly fill the gaps by fast positioning. Thereby, the operator does not need to take hands of the cross-gate control device 38 to impact settings in the display 32. In response to the operation of the user-operable control device by the operator, the ECU 26 will execute the method steps S101 to S104 analogously as described above.

It may also be advantageous to enable the operator to switch between the modes by means of the cross-gate mode switch 39. Especially when the forage harvester 100 is operated in PATH mode, it may be necessary to quickly rotate the spout assembly 122 about vertically axis AXS1 to a position 181*b* for avoiding a collision with a (high voltage) transmission tower 173. As in PATH mode, the movement may take longer time (due to calculations based on the kinematic model) or be restricted by kinematic limitations (as target point 133 cannot be moved close to longitudinal centre axis of the forage harvester 100, mainly due to motion limits of spout flap 132), the operator may switch to DIRECT mode to quickly move the spout assembly 122 out of the collision area by a rotation about axis AXS1 using the user-operable control device, e. g. cross-gate control device 38, in the high speed/oil flow operating ranges. The same advantageous functionality can be used during headland operation when the agricultural machine 203 changes to drive parallel at the other side of the forage harvester 100. The operator can comfortably switch to quickly move the spout assembly 122 to a mirrored position about axis AXS1 using the user-operable control device in the high speed/oil flow operating ranges.

Depending on whether the operator selected the PATH mode or the DIRECT mode, the ECU 26 activates the corresponding mode for the operating ranges of both first/second control direction CD1/CD2 and third/fourth control direction CD3/CD4 (step S106).

As the operator can select the different operating ranges without taking hands off, a comfortable operation of the operator controls 28 is provided. As the operating ranges with higher oil flow will be reached when the haptic feedback at positions B1, D1, B2, D2 has been overcome, unintentional increase of speed can be avoided. The operator can fully concentrate on the harvesting operation and does not need to adjust settings in the display 32.

The method may comprise additional method steps, such as step S107. The method may stop with step S110 when the operator has finished his operation.

As can be seen in FIG. 5 and FIG. 10, the settings of the oil flow for the different operating ranges can be defined by separate constant values. I. e., a constant value is assigned to each operating range. When a user-operable control device is moved in a control direction (CD1, CD2, CD3 or CD4) from one operating range to another operating range, the change of the operating range of the user-operable control device results in a change of the oil flow in a discrete step from the oil flow value assigned to the one operating range to the oil flow value of the other operating range. As can be exemplarily seen in GUI portion 33*e*, a change of the user-operable control device from the operating range RAB1 to the operating range RBC1 results in a discrete step of 30 l/min from 60 l/min to 90 l/min and vice versa. Similarly, discrete steps are defined for a change of the user-operable control device between operating ranges RAD1 and RDE1, between operating ranges RAB2 and RBC2 and between operating ranges RAD2 and RDE2 as can be seen in the GUI portions 33*a* to 33*l* (see FIG. 5 and FIG. 10).

Figure 11:
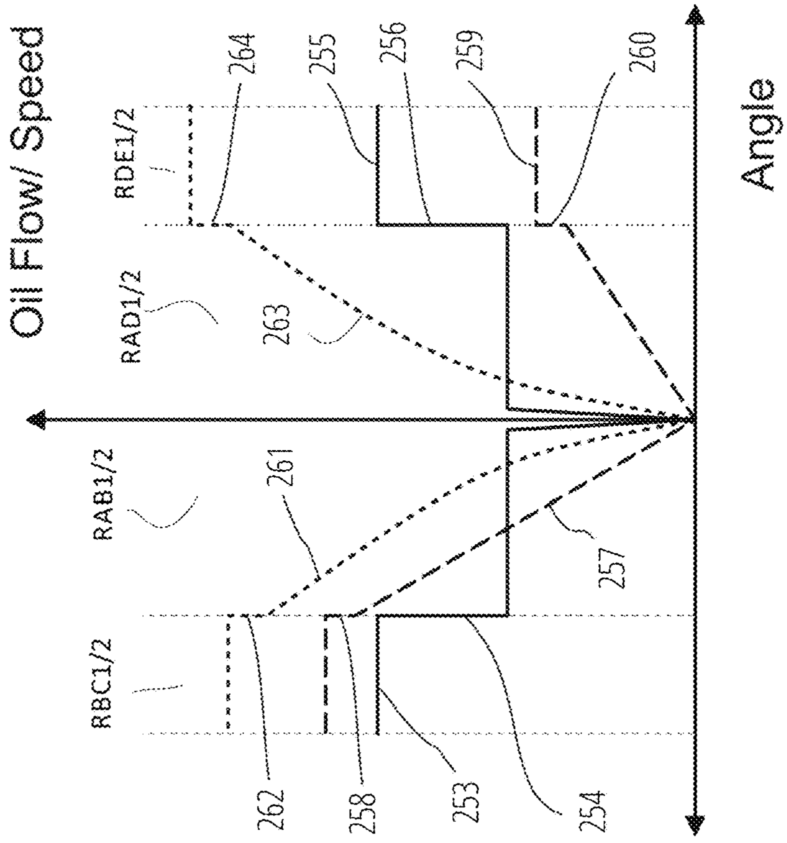
FIG. 11 illustrates a diagram of oil flow/speed of a motion drive over angle of a user-operable control device.

As can be seen in FIG. 11, the same record is illustrated by graph 253 and graph 255 showing the oil flow or speed of a motion drive over the angle of a movement of a user-operable control device. Graph 253 can be assigned to the operating ranges RAB1 and RBC1 and to the operating ranges RAB2 and RBC2 and shows a discrete step 254 at a transition point between the operating ranges RAB1/RBC1 respectively RAB2/RBC2. Analogously, graph 255 can be assigned to the operating ranges RAD1 and RDE1 and to the operating ranges RAD2 and RDE2 and shows a discrete step 256 at a transition point between the operating ranges RAD1/RDE1 respectively RAD2/RDE2. Thus, a movement of the user-operable control device from one operating range to another operating range causes a change of the speed of the corresponding motion drive according to the discrete step. For example, a movement of the cross-gate control device 38 from the operating range RAB1 to operating range RBC1 increases the oil flow by a discrete step of 30 l/min to 90 l/min according to GUI portion 33*e* and a movement from operating range RDE2 to operating range RAD2 decreases the oil flow by a discrete step of 30 l/min to 30 l/min according to GUI portion 33*f* (see FIG. 5).

Figure 12:
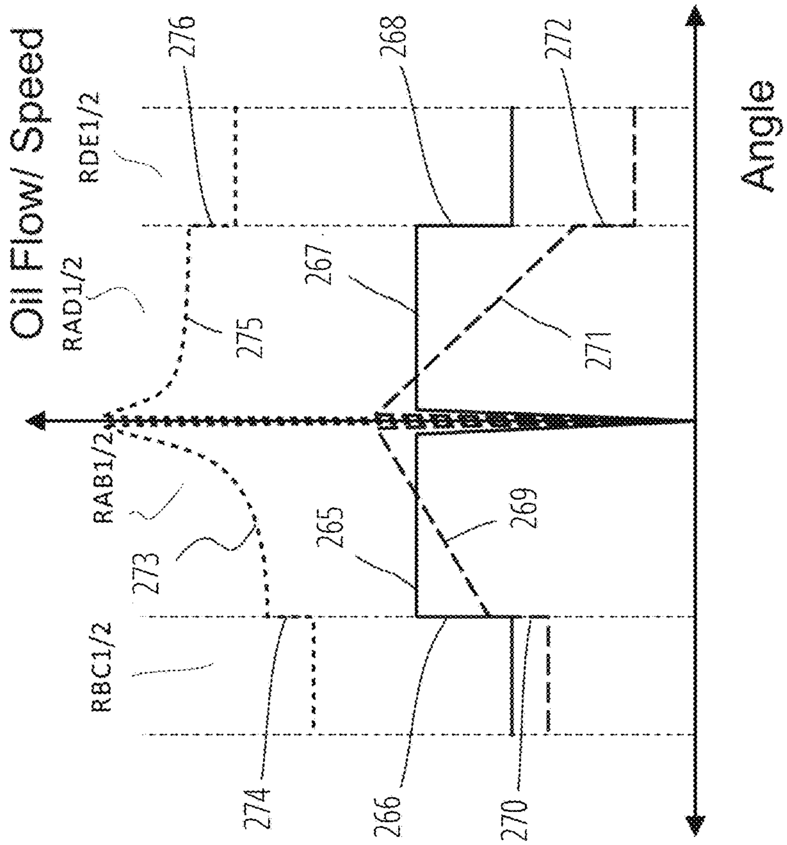
FIG. 12 illustrates a diagram of oil flow/speed of a motion drive over angle of a user-operable control device.

By usage of the turn-and-press control device 29 or the touch sensitive display 32, the operator may manipulate the speed or oil flow settings to define alternative graphs as indicated by graph 257 having a discrete step 258, graph 259 having a discrete step 260, graph 261 having a discrete step 262 and graph 263 having a discrete steps 264 as illustrated in FIG. 11 and by graph 265 having a discrete step 266, graph 267 having a discrete step 268, graph 269 having a discrete step 270, graph 271 having a discrete step 272, graph 273 having a discrete step 274 and graph 275 having a discrete step 276 as illustrated in FIG. 12. I. e., the speed or oil flow values of a specific operating range may be constant as indicated by graphs 253, 255, 265 and 267, increase or decrease linearly as indicated by graphs 257, 259, 269 and 271, or increase or decrease non-linearly as indicated by graphs 261, 263, 273 and 275 wherein each graph comprises a discrete step.

The discrete steps may have a minimum value. For example, discrete step 254 has a minimum value of at least 10%, 20%, 35%, 50% or 75% of the value assigned to the operating range RBC1 (see graph 253). Analogously, discrete step 256 has a minimum value of at least 10%, 20%, 35%, 50% or 75% of the value assigned to the operating range RDE1 (see graph 255).

The speed or oil flow settings assigned to the operating ranges RAB1 and RAD1 are set with lower values compared to the operating ranges RBC1 and RDE1 and the speed or oil flow settings assigned to the operating ranges RAB2 and RAD2 are set with lower values compared to the operating ranges RBC2 and RDE2 as depicted in FIG. 5 and FIG. 10. This is advantageous because when the lever of a user-operable control device is deflected out of the neutral position, the motion drive starts with lower speed and the speed is increased by changing the operating range at higher deflection.

Alternatively, as depicted in FIG. 12, the operator may choose a setting wherein the oil flow values of RAB1 and RAD1 are set with lower oil flow values compared to the operating ranges RBC1 and RDE1, and the oil flow values of RAB2 and RAD2 are set with lower oil flow values compared to the operating ranges RBC2 and RDE2. If the preference is to focus on faster operation at beginning of the deflection when precise control is not needed less frequently than high speed operation, this may be set as depicted with graphs 265, 267, 269, 271, 273 and 275.

Furthermore, the values for the operating ranges in opposite direction may be asymmetrical as exemplarily depicted with graphs 257/259, 261/263, 269/271, and 273/275 in contrast to graphs 253/255 and 265/267.

Figure 13:
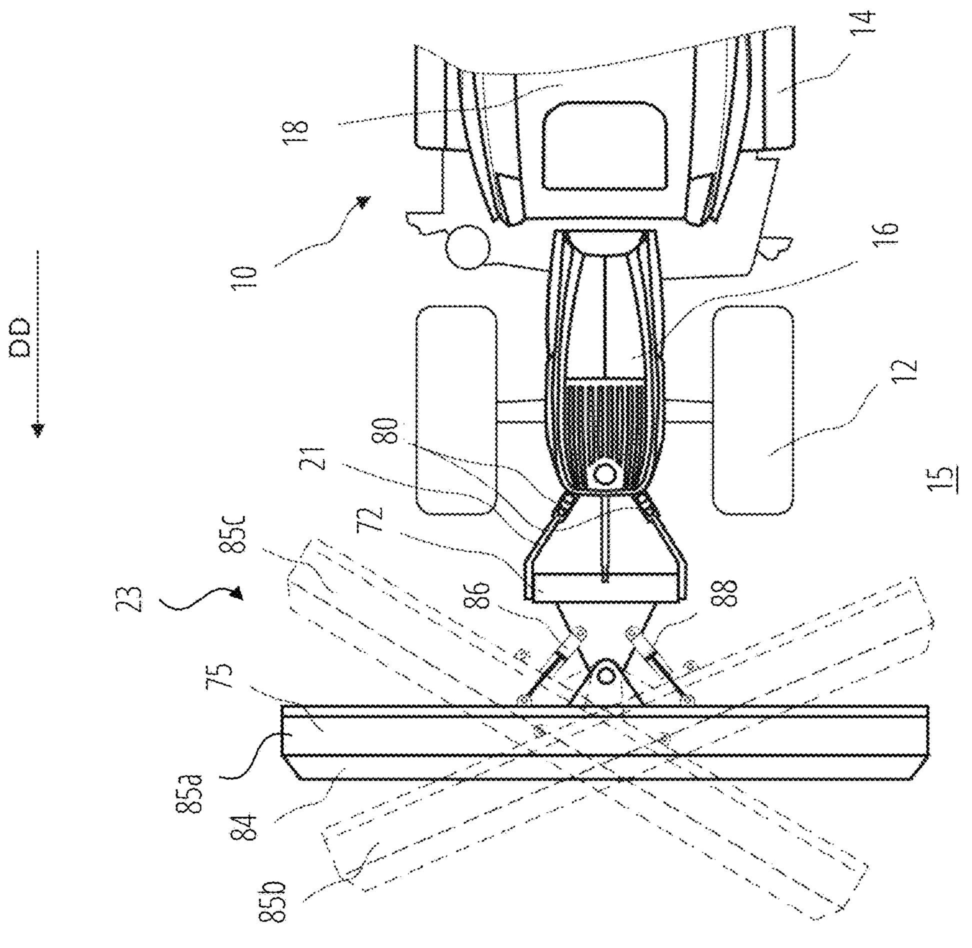
FIG. 13 illustrates a tractor with a plough shield.

With reference to FIG. 13, the control system 42 may be used for snow ploughing operation. For this operation, a tractor 10 comprising a second working component 23 is used as agricultural machine. At least parts of the motion drives, here cylinders 86 and 88, are installed on the second working component 23 comprising a tool holder 72 and the plough shield 84 as a tool 75, rather than on the vehicle itself. The tool holder 72 is provided as attachment of the plough shield 84 to the front hitch 21 of the agricultural machine. The front hitch 21 may be adjusted by front hitch cylinders 80. The plough shield 84 can be lifted to a demanded height by the front hitch 21. The plough shield 84 can be rotated relatively to the tool holder 72 about an approximately perpendicular axis to ground 15 via the cylinders 86 and 88. Cylinders 86 and 88 are single-acting cylinders to throw snow to different sides of a road by changing the orientation of the plough shield 84 from a neutral shield position 85*a* to a shield position 85*b* or a shield position 85*c*. While in one situation, the height of the plough shield 84 needs to be slowly adjusted to change a distance to ground 15 by using the user-operable control device in operating ranges RAB1 or RAD1, the plough shield 84 may be quickly lifted to avoid a collision by using operating ranges RBC1 or RDE1. While in another situation, the orientation of the plough shield 84 must be slowly adjusted to control the snow throw out by using the user-operable control device in operating ranges RAB2 or RAD2, the plough shield 84 may be quickly oriented to the other side (shield position 85*b* or 85*c*) by using operating ranges RBC2 or RDE2. The settings for the user-operable control device may be defined as shown in GUI portion 33*e* and 33*f* (see FIG. 5).

Figure 14:
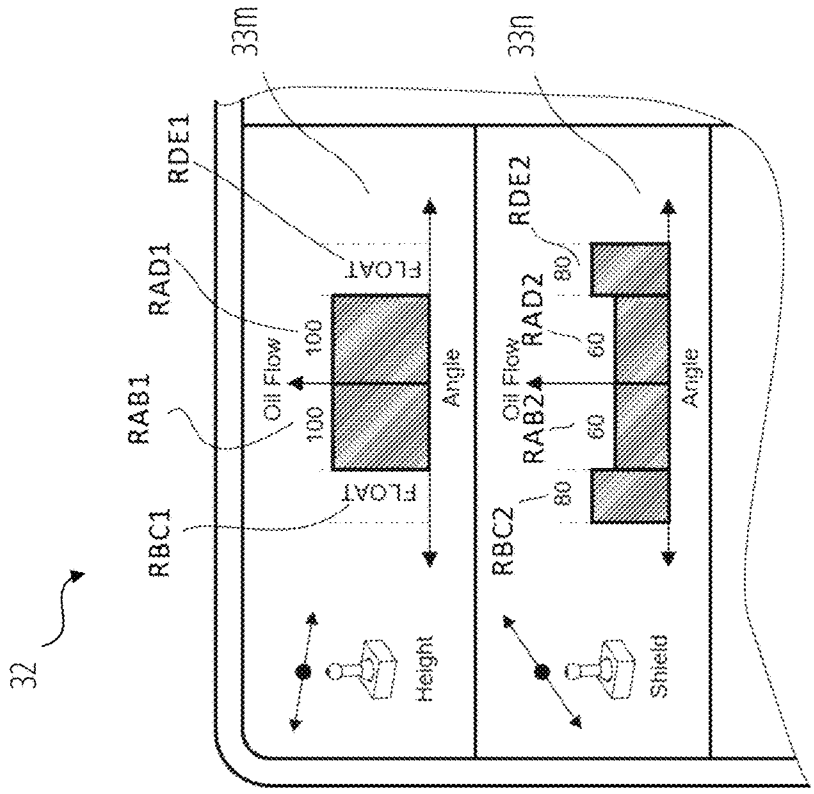
FIG. 14 illustrates speed settings for an user-operable control device.

Furthermore as depicted in FIG. 14, the operator may choose a setting for the actuation of the front hitch 21 that provides a FLOAT functionality by which the plough shield 84 follows the ground 15 by its weight. The FLOAT functionality can be assigned to the operating ranges RBC1 or RDE1 as indicated in GUI portion 33*m* in FIG. 14. As can be seen in the GUI portion 33*n* in FIG. 14, the setting for adjusting the orientation of the plough shield 84 may remain the same as shown by GUI portion 33*f* in FIG. 5 since a FLOAT functionality is not wanted for adjusting the orientation of the plough shield 84.

All references cited herein are incorporated herein in their entireties. If there is a conflict between definitions herein and in an incorporated reference, the definition herein shall control.

LISTING OF DRAWING ELEMENTS 10 tractor
12 front wheel
14 rear wheel
15 ground
16 engine section
18 cab section
20 hitch
21 front hitch
22 first working component
23 second working component
24a position
24b position 24c position
26 ECU
28 operator controls
29 turn-and-press control device
30 armrest
32 display
33a GUI portion
33b GUI portion
33c GUI portion
33d GUI portion
33e GUI portion
33f GUI portion
33g GUI portion
33h GUI portion
33i GUI portion
33j GUI portion
33k GUI portion
33l GUI portion
33m GUI portion
33n GUI portion
34 drive lever
35 scroll wheel control device
36 scroll wheel control device
37 scroll wheel mode switch
38 cross-gate control device
39 cross-gate mode switch
40 rocker control device
41 Rocker mode switch
42 control system
43 linear control device
44 valve
45 linear control device mode switch
46 valve
47 cross-gate mode switch
48 valve
50 hydraulic line
52 hydraulic line
54 cylinder
56 wire
58 wire
60 wire
70 cylinder
72 tool holder
74 cylinder
75 tool
76a position
76b position
76c position
76d position
80 front hitch cylinder
84 plough shield
85a shield position
85b shield position
85c shield position
86 cylinder
88 cylinder
100 forage harvester
112 front wheels
114 rear wheels
116 engine section
118 cab section
120 header
122 spout assembly
124 spout base
126 spout drive
128 spout bow
130 spout bow cylinder
132 spout flap
133 target point
134 cylinder
158 interface
159 controller
160 memory
173 transmission tower
181a position
181b position
183 virtual plane
185 spout reference point
191 crop discharge path 193 start point
195 path portion
197 path portion
199 path portion
201 end point
203 agricultural machine
205 tractor
207 loading wagon
208 crop
209 tailgate
213 agricultural machine
253 graph
254 discrete step
255 graph
256 discrete step
257 graph
258 discrete step
259 graph
260 discrete step
261 graph
262 discrete step
263 graph
264 discrete steps
265 graph
266 discrete step
267 graph
268 discrete step
269 graph
270 discrete step
271 graph
272 discrete step
273 graph
274 discrete step
275 graph
276 discrete step

What is claimed is:

1. An agricultural machine, comprising:

a working component;

a first motion drive for adjusting a position of the working component;

operator controls with a user-operable control device moveable in a first control direction from a first operating range to a second operating range; and a control unit configured to:

determine a first speed demand dependent on a first current operating range of the user-operable control device out of the first and second operating ranges;

control the speed of the first motion drive according to the first speed demand; wherein:

the first speed demand changes in a first discrete step in response to a movement of the user-operable control device from the first operating range to the second operating range;

the second operating range is configured for demanding a floating mode for a self-adjustment of the position of the working component in dependence of a weight of the working component and/or forces applied vertically on said working component;

the operator controls comprise a mode switch for activating the floating mode;

the second operating range is configured for demanding the floating mode when the floating mode is active and demanding a speed value when the floating mode is inactive.

2. The agricultural machine of claim 1, wherein:

the user-operable control device is moveable in a second control direction opposite to the first control direction from a third operating range to a fourth operating range; and the control unit is configured to determine a first speed demand dependent on a first current operating range of the user-operable control device out of the first to fourth operating ranges; wherein the first speed demand changes in a second discrete step in response to a movement of the user-operable control device from the third operating range to the fourth operating range.

3. The agricultural machine of claim 2, wherein the user-operable control device comprises a neutral position between the first operating range and the third operating range.

4. The agricultural machine of claim 2, wherein the first discrete step has a different value than the second discrete step.

5. The agricultural machine of claim 1, comprising:

a second motion drive for adjusting a position of the working component; wherein the user-operable control device is moveable in a third control direction lateral to the first control direction from a fifth operating range to a sixth operating range; and the control unit is configured to determine a second speed demand dependent on a second current operating range of the user-operable control device out of the fifth and sixth operating ranges; and control the speed of the second motion drive according to the second speed demand; wherein the second speed demand changes in a third discrete step in response to a movement of the user-operable control device from the fifth operating range to the sixth operating range.

6. The agricultural machine of claim 5, wherein:

the working component comprises a tool holder and a tool relatively movable in respect of the tool holder;

the tool holder is driven by one the first and second motion drives; and the tool is driven by the other motion drive.

7. The agricultural machine of claim 5, wherein one of the first and second motion drives is a rotational motion drive providing a rotational movement and the other motion drive is a translational motion drive providing a translational movement.

8. The agricultural machine of claim 1, wherein the user-operable control device is configured to provide a haptic feedback due to a movement of the user-operable control device from the first operating range to the second operating range.

9. The agricultural machine of claim 1, wherein the first operating range and the second operating range are each configured for demanding a constant speed value.

10. The agricultural machine of claim 1, wherein one of the first and second operating ranges is configured for demanding a constant speed value; and the other operating range is configured for demanding an increasing or decreasing speed value.

11. The agricultural machine of claim 1, wherein the first operating range is configured for demanding a higher speed value than the second operating range.

12. The agricultural machine of claim 5, wherein the first operating range is configured for demanding a higher speed value than the fifth operating range.

13. The agricultural machine of claim 1, wherein:

the first operating range is configured for demanding a lower speed value when the floating mode is inactive; and demanding a higher speed value when the floating mode is active.

14. The agricultural machine of claim 5, wherein:

the first operating range is configured to move an element of the working component parallel to a driving direction of an agricultural machine; and the fifth operating range is configured to move the element of the working component lateral to the driving direction of the agricultural machine.

15. A method of controlling a working component, comprising determining a first speed demand dependent on a first current operating range of a user-operable control device out of first and second operating ranges;

controlling a speed of a first motion drive according to the first speed demand; wherein the first speed demand changes in a first discrete step in response to a movement of the user-operable control device from the first operating range to the second operating range;

wherein the second operating range is configured for demanding a floating mode for a self-adjustment of the position of the working component in dependence of a weight of the working component and/or forces applied vertically on said working component;

wherein operator controls comprise a mode switch for activating the floating mode; and wherein the second operating range is configured for demanding the floating mode when the floating mode is active and demanding a speed value when the floating mode is inactive.

* * * * *